US006679181B2

(12) United States Patent
Fox

(10) Patent No.: US 6,679,181 B2
(45) Date of Patent: Jan. 20, 2004

(54) DUAL MODE TRANSPORTATION SYSTEM AND METHOD

(76) Inventor: Richard B. Fox, 211 Glen Ridge Ave., Los Gatos, CA (US) 95030

( * ) Notice: Subject to any disclaimer, the term of this patent is extended or adjusted under 35 U.S.C. 154(b) by 0 days.

(21) Appl. No.: 09/865,088

(22) Filed: May 24, 2001

(65) Prior Publication Data

US 2002/0175248 A1 Nov. 28, 2002

(51) Int. Cl.⁷ .................................. B61K 1/00
(52) U.S. Cl. ....................... 104/20; 180/14.1
(58) Field of Search ................. 104/18, 20; 213/75 R, 213/88; 105/1.4, 3, 8.1, 15; 180/14.1, 14.2, 14.6

(56) References Cited

U.S. PATENT DOCUMENTS

| | | |
|---|---|---|
| 1,302,686 A | 5/1919 | Lock |
| 1,804,257 A | 5/1931 | Greenley |
| 3,363,584 A | 1/1968 | Brush et al. |
| 3,552,321 A | 1/1971 | Priebe |
| 3,587,470 A | 6/1971 | Wilson |
| 3,734,025 A * | 5/1973 | Shoemaker ............... 104/18 |
| 3,839,964 A | 10/1974 | Gayot |
| 3,845,717 A | 11/1974 | Alimanestianu |
| 3,861,315 A | 1/1975 | Rypinski |
| 3,889,770 A | 6/1975 | Herbert |
| 3,910,196 A | 10/1975 | Denenburg |
| 3,929,076 A | 12/1975 | McRae, Jr. et al. |
| 4,503,779 A * | 3/1985 | Chadwick ............... 105/4 R |
| 4,762,191 A | 8/1988 | Hagin et al. |
| 5,740,930 A * | 4/1998 | Smit ....................... 180/14.1 |
| 5,790,403 A | 8/1998 | Nakayama |
| 5,875,408 A | 2/1999 | Bendett et al. |
| 5,957,983 A * | 9/1999 | Tominaga ................. 701/23 |
| 6,115,652 A | 9/2000 | Sato et al. |
| 6,169,954 B1 | 1/2001 | McCrary |

OTHER PUBLICATIONS

Anderson, J. Edward, "Transit Systems Theory: Engineering Science Applied to Public Transportation, A Collection of Papers", Taxi 2000 Corporation, (2000), 5 pages.
Reynolds, PE, Francis D., "DualMode, the Transportation of the Future", Presented at the New Visions in Transportation Conference, Aspen, Colorado, Oct. 20, 2000, (Oct, 2000), 11 pages.
Jensen, Palle, "RUF Personal and Group Dualmode Transportation Technology Overview", website article located at: http://faculty.washington.edu/~jbs./itrans/ruf1.htm,, (Jan. 15, 2001), 2 pages.
Balslev, Mogens et al., "RUF Dual Mode Transportation Systems", RUF International, (Mar. 5, 2001), 2 pages.
Author unknown, "FlexiTrain", website article located at: http://camdek.com, (Aug. 3, 2001), 2 pages.
Frank, Andrew A., "Vehicle Mass Transit System (VMTS) (aka Autobus or Carbus System)", Department of Mechanical and Aerospace Engineering, University of California at Davis, website article printed on (Aug. 3, 2001), 8 pages.
Author unknown, "Autran Corp. Transportation Page", Autran Corp., website article located at: http://www.autrancorp.com, printed on (Aug. 3, 2000), 2 pages.

(List continued on next page.)

Primary Examiner—S. Joseph Morano
Assistant Examiner—Robert J. McCarry, Jr.
(74) Attorney, Agent, or Firm—Dorsey & Whitney LLP

(57) ABSTRACT

A transportation system for use on a roadway having first and second lanes. The system has a lead vehicle adapted for travel at high speeds on the roadway and a passenger vehicle adapted for travel at high speeds on the roadway. Means for coupling the passenger vehicle to the lead vehicle while the lead vehicle and the passenger vehicle are traveling at high speeds on the roadway so that the passenger vehicle travels with the lead vehicle on the roadway is provided.

36 Claims, 13 Drawing Sheets

OTHER PUBLICATIONS

Author unknown, "Autran Carrier Vehicles in Guideways Carry Autos, Passengers and Freight", Autran Corp., website article located at http://www.autotrancorp.com/cv/cv0, printed on (Aug. 3, 2000), 1 page.

Author unknown, "Autran Transfer Features", Autran Corp., website article located at: http://www.autrancorp.com/tr/tr1, printed on (Aug. 3, 2000), 1 page.

Author unknown, "Autran electronic Control System", Autran Corp., website article located at: http://www.autracorp.com/ec/cont, printed on (Aug. 3, 2000), 1 page.

Author unknown, "Autran Carrier Vehicle Construction", Autran Corp., website article located at: http://www.autrancorp.com/cv/cv1, printed on (Aug. 3, 2000), 2 pages.

Author unknown, "Autran Passengers Stations and Cabins", Autran Corp., website article located at: http://autrancorp.com/pc/pass1, printed on (Aug. 3, 2000), 2 pages.

Author unknown, "Autran Foldable Auto Platform", Autran Corp., website article located at: http://autrancorp.com/1d/plat1, printed on (Aug. 3, 2000), 2 pages.

Author unknown, "Autran System for Fast Loading and Unloading of Autos onto and from Platforms", Autran Corp., website article located at: http://www.autrancorp.com/id/load1, printed on (Aug. 3, 2000), 1 page.

Author unknown, "Dualmode Debate Page", website article located at: http://www.washington.edu/~jbs/dualdbte.htm, printed on (Aug. 3, 2001), 9 pages.

\* cited by examiner

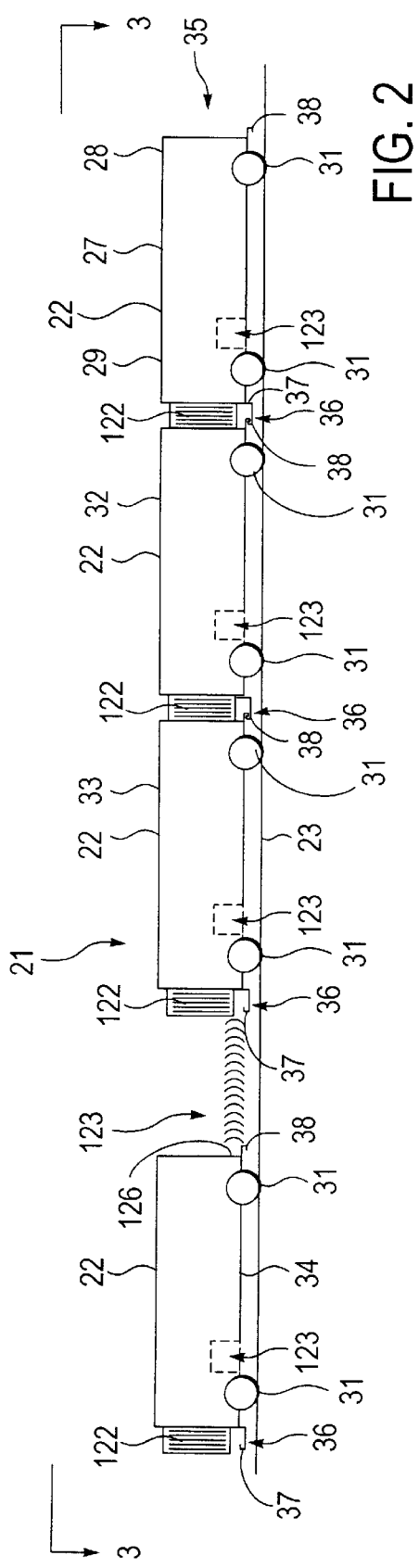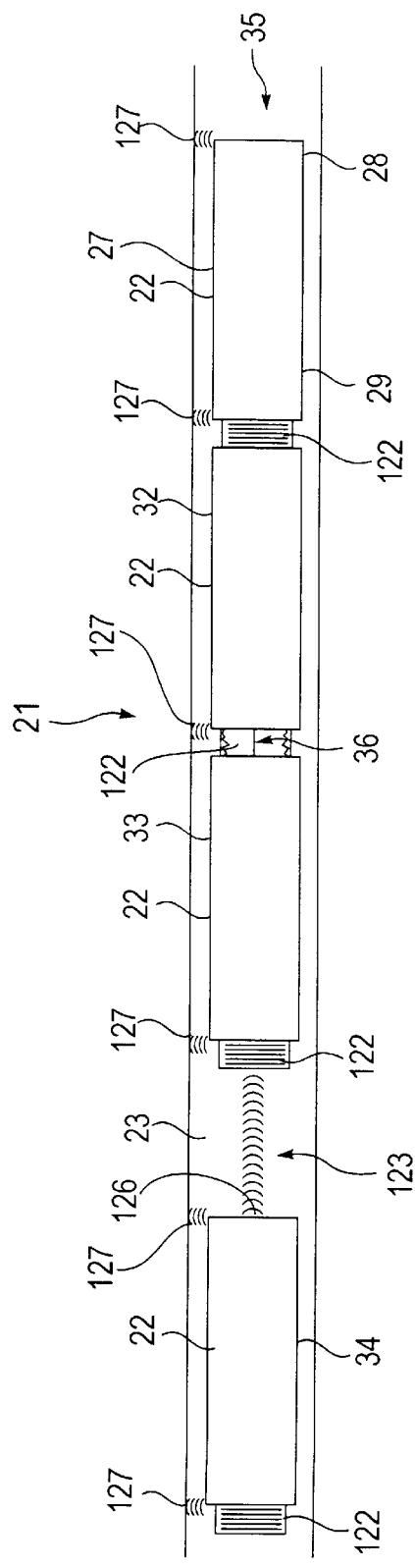

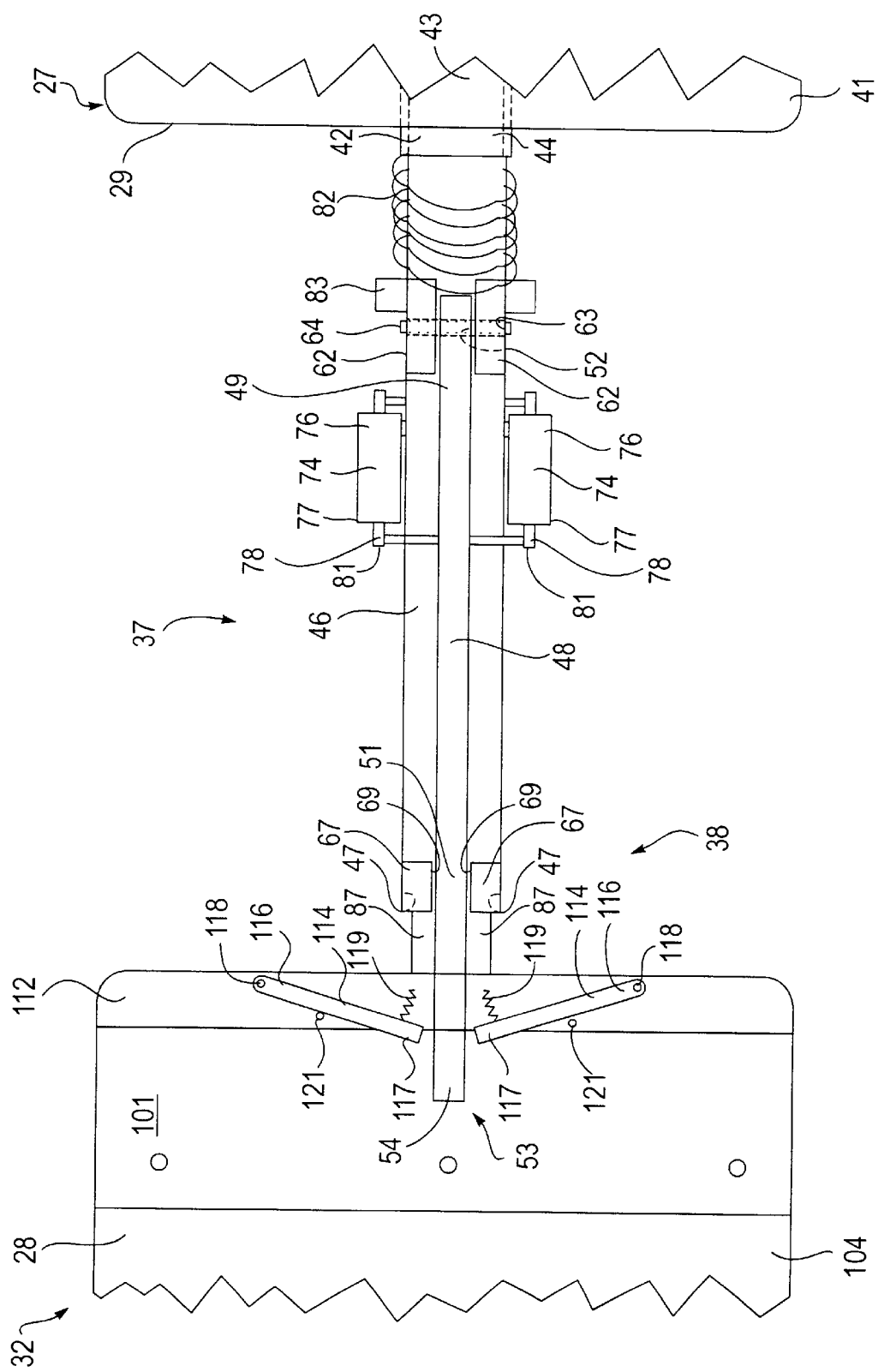

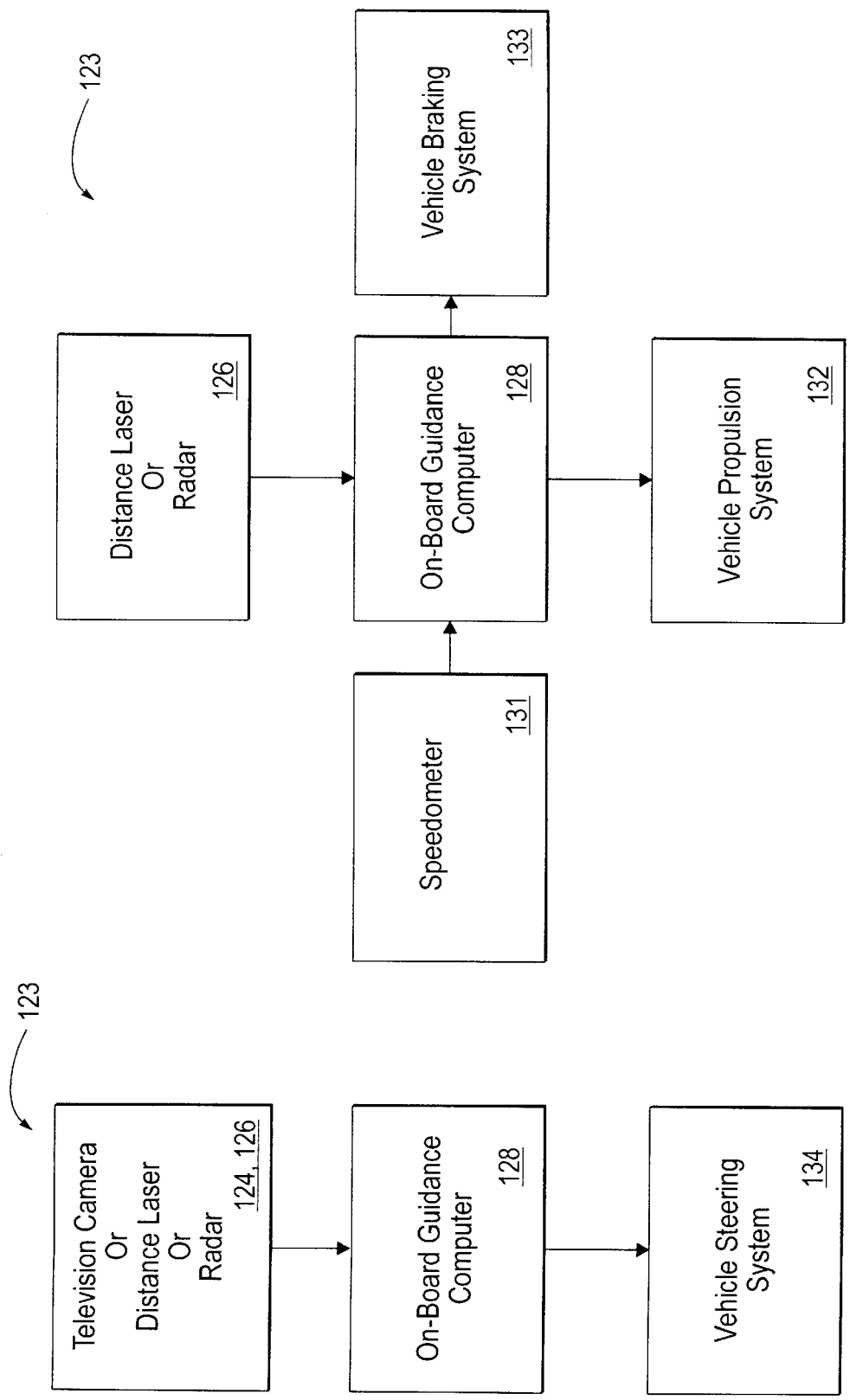

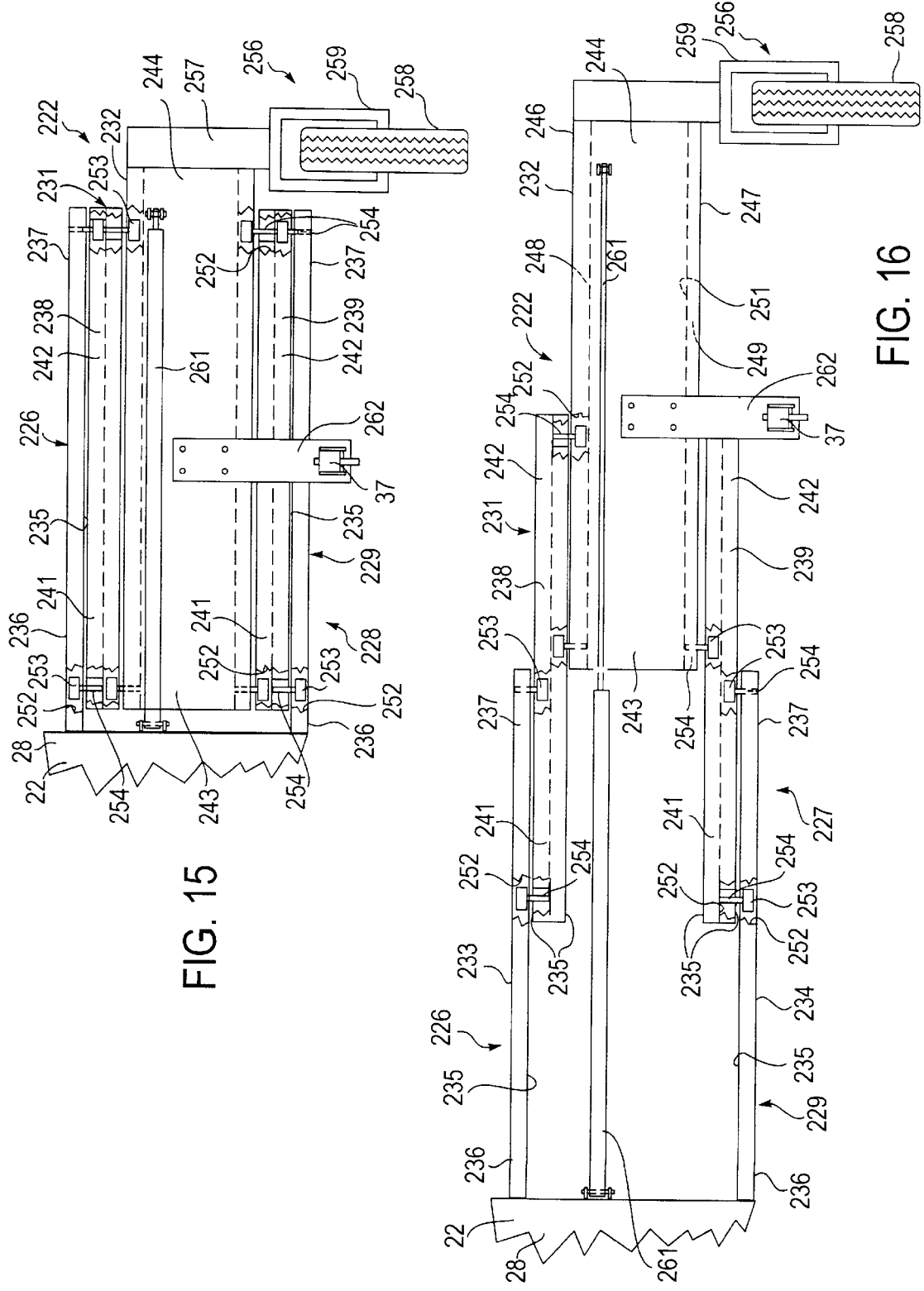

DUAL MODE TRANSPORTATION SYSTEM AND METHOD

FIELD OF THE INVENTION

This invention pertains generally to transportation systems and, more particularly, to dual mode transportation systems.

BACKGROUND OF THE INVENTION

Mass transit systems have heretofore been proposed and provided. There is, however, a need for a transportation system which is energy efficient, more cost effective, readily accessible and user friendly.

OBJECTS OF THE INVENTION

In general, it is an object of the present invention to provide a dual mode transportation system which utilizes conventional vehicles.

Another object of the invention is to provide a system of the above character which conserves energy.

Another object of the invention is to provide a system of the above character that is user friendly and readily accessible.

Another object of the invention is to provide a system of the above character that is cost effective.

Additional objects and features of the invention will appear from the following description from which the preferred embodiments are set forth in detail in conjunction with the accompanying drawings.

BRIEF DESCRIPTION OF THE DRAWINGS

FIG. 2 is an enlarged schematic side elevational view of a portion of the dual mode transportation system of FIG. 1 taken along the line 2—2 of FIG. 1 and showing a vehicle in close proximity to a train of interconnected vehicles for coupling thereto.

FIG. 3 is a top plan view partially cut away taken along the line 3—3 of FIG. 2.

FIG. 10 is a bottom plan view taken along the line 10—10 of FIG. 8.

FIG. 11 is a block diagram of the guidance control system of the present invention.

FIG. 12 is a block diagram of the velocity control system of the present invention.

FIG. 15 is a side elevational view of the extendable arm of the embodiments of FIGS. 13 and 14 taken along the line 15—15 of FIG. 14 showing the arm in the retracted configuration.

FIG. 16 is a side elevational view taken along the line 16—16 of FIG. 14 showing the arm in the extended position.

DETAILED DESCRIPTION OF THE INVENTION

In general, a transportation system for use on a roadway having first and second lanes is provided. The system has a lead vehicle adapted for travel at high speeds on the roadway and a passenger vehicle adapted for travel at high speeds on the roadway. Means for coupling the passenger vehicle to the lead vehicle while the lead vehicle and the passenger vehicle are traveling at high speeds on the roadway so that the passenger vehicle travels with the lead vehicle on the roadway is provided.

Figure 1:
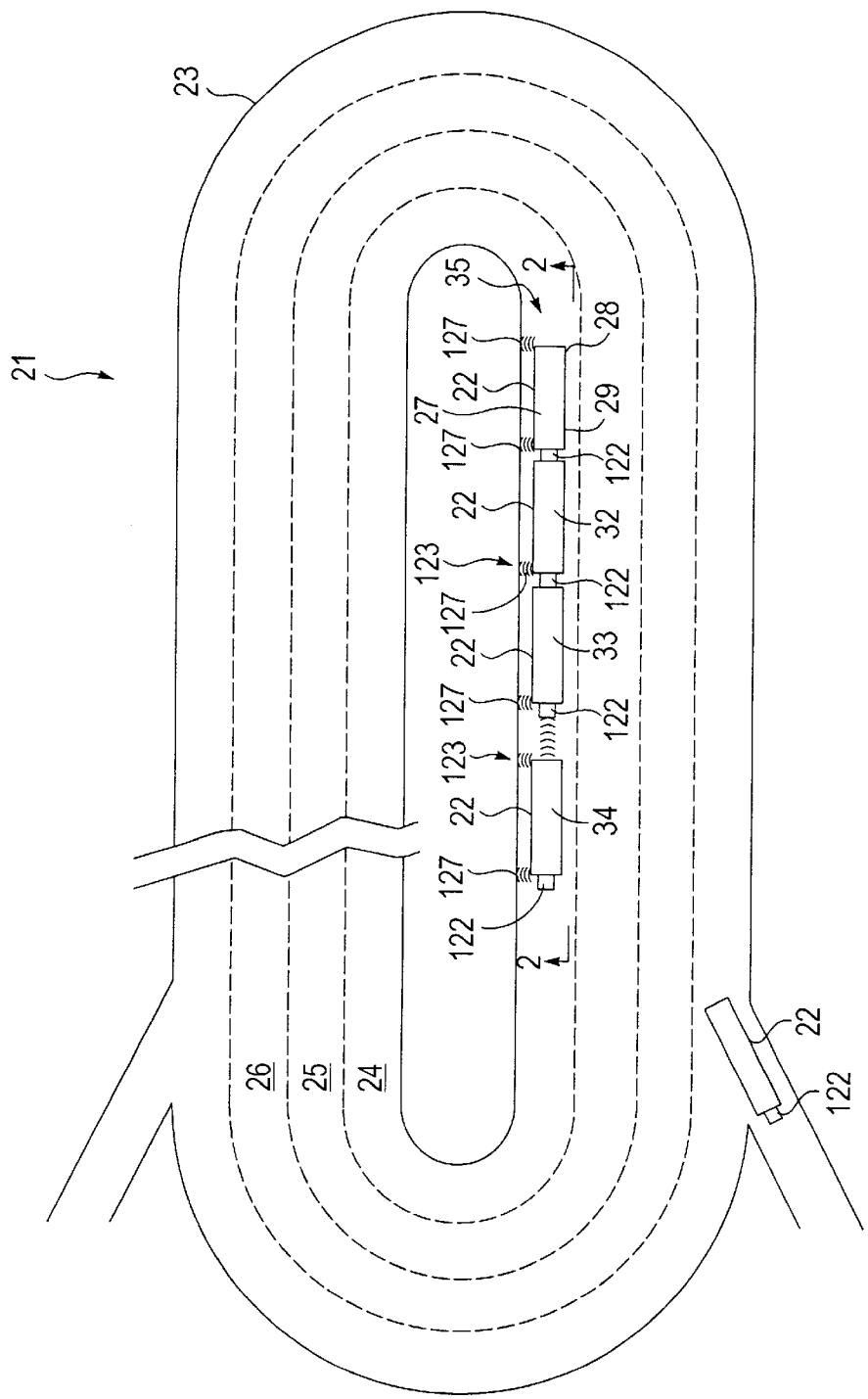
FIG. 1 is a top plan schematic view of a dual mode transportation system of the present invention which includes a train of interconnected vehicles on a roadway.

More specifically, the dual mode transportation system 21 of the present invention is for use with conventional vehicles adapted for high speed travel alone or while coupled to one another. In a preferred embodiment, passenger buses 22 travel on a conventional primary or main roadway 23 having multiple lanes 24, 25 and 26 (see FIG. 1). Preferably, roadway 23 is configured with at least one loop therein so that vehicles 22 do not have to slow significantly or stop completely in order to reverse direction at either end of a route. A lead or first vehicle 27 having front and rear ends 28 and 29 and being supported by conventional wheels and rubber tires 31 is coupled to second and third, similar trailing buses 32 and 33. Entrained buses 32 and 33 are oriented in a linear configuration 35 with respect one another as shown in FIGS. 1–3. A fourth independent bus 34 is also shown preparing to couple to bus 33. Cooperative means 36 is carried by lead and trailing vehicles 27, 32 and 33 for coupling to one another while the same are traveling on roadway 23 at variable and substantially equal speeds up to legal speed limits typical for vehicular travel on open highways. Preferably, coupling means 36 includes a hook assembly 37 carried by rear end 29 and a latch assembly 38 carried by front end 28 of each bus 22. To this end, vehicles 22 are preferably similar in configuration so as to be substantially interchangeable with minimal to no modifications.

In one preferred embodiment, hook assembly 37 is mounted to rear end 29 of first or lead vehicle, such as vehicle 27. More specifically, assembly 37 includes an elongate tubular frame member 42 having proximal and distal extremities 43 and 44 as seen in FIGS. 4–10. Proximal extremity 43 is secured to or constructed integral with the bumper or frame 41 of first vehicle 27 in an appropriate manner similar to that used for heavy-duty towing hitches.

Thus, in the case of being separately affixed to frame or bumper 41, frame member 42 is provided with a flange, plate (not shown) or other similar fixture by which a secure mount can be achieved. When correctly mounted, frame member 42 extends rearward of rear end 29 of vehicle 27 and substantially parallel to roadway 23.

Frame member 42 is, preferably, constructed of a heavy duty metal such as steel which can be plated or made stainless in any conventional manner. In addition, frame member 42 preferably has either a square or otherwise appropriately configured cross-section and, as such, a hollow core or channel (not shown). Thus, the thickness of the wall of frame member 42 ranges from approximately 6 to 12 millimeters, preferably being approximately 8 millimeters, and the channel is provided with a greater cross-sectional dimension ranging from approximately 80 to 150 millimeters, preferably being approximately 100 millimeters. Frame member 42 has a length ranging from approximately 30 to 80 centimeters and, preferably, approximately 50 centimeters.

Hook assembly 37 is also provided with an elongate tubular main member 46 extending along a longitudinal axis which, preferably, is constructed of a material similar or identical to that of frame member 42. Main member 46 has the same cross-sectional shape and wall thickness as frame member 42 and is similarly provided with an internal channel or hollow core 47. In addition, main member 46 is sized so as to be concentrically and slidably or telescopically disposed within frame member 42. Thus, cross-sectional dimensions of main member 46 are slightly less than the corresponding dimensions of frame member 42.

Figure 4:
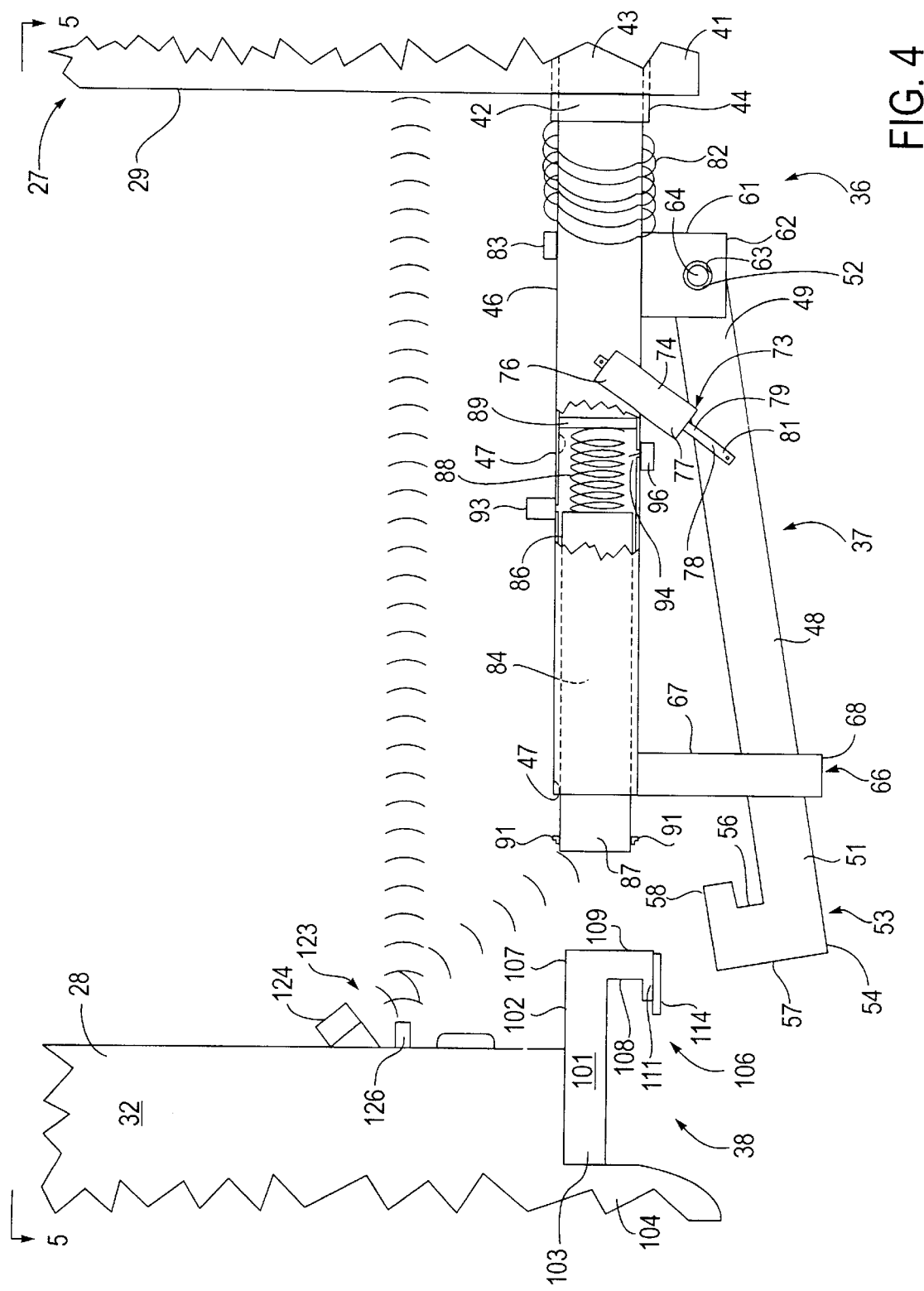
FIG. 4 is a side elevational view partially cut away of the hook and latch coupling mechanism of the present invention carried by two vehicles in close proximity for coupling together.
Figure 5:
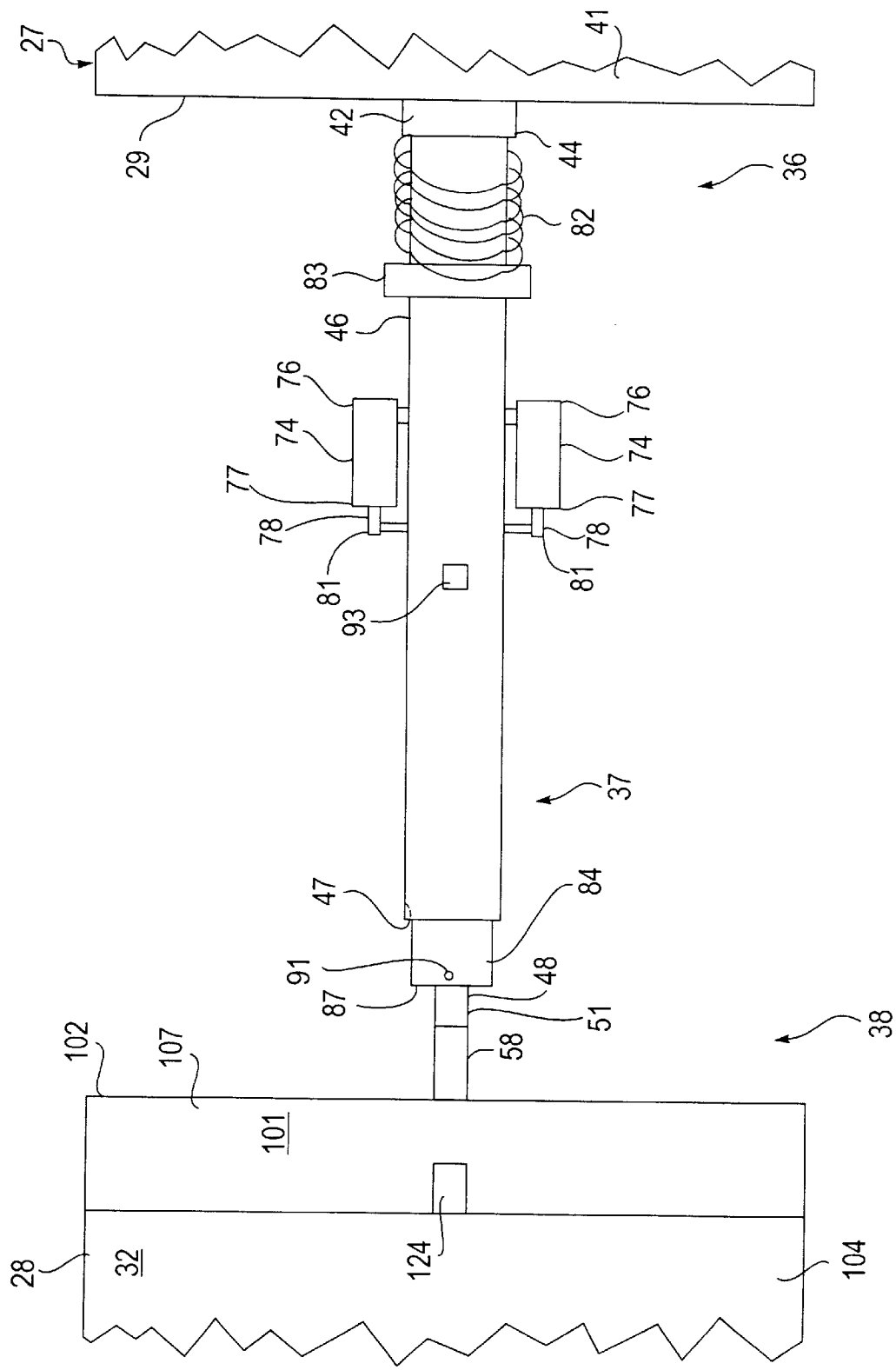
FIG. 5 is a top plan view taken along the line 5—5 of FIG. 4.
Figure 6:
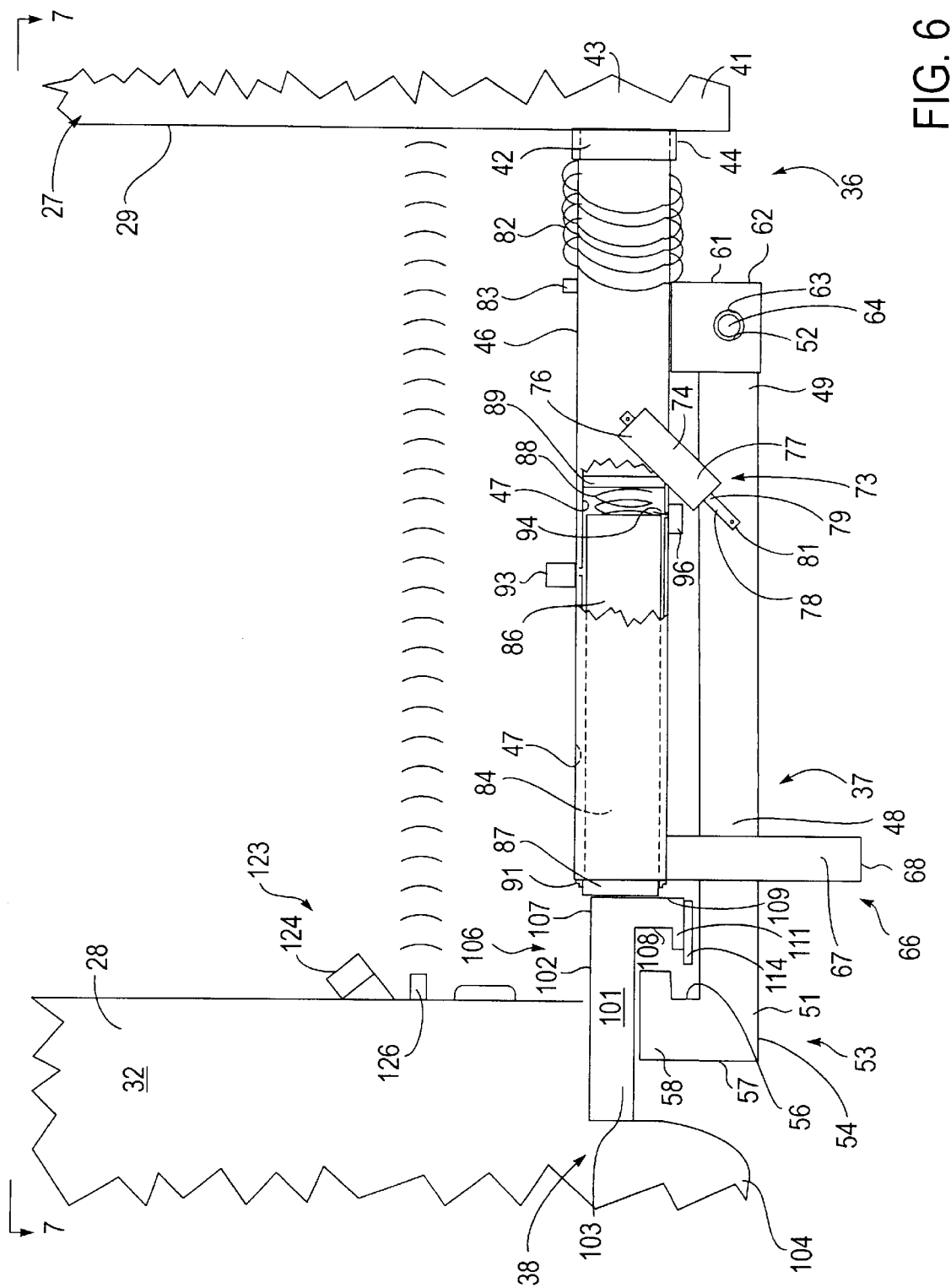
FIG. 6 is side elevational view similar to FIG. 4 with the two vehicles initially coupled but not yet fully secured together.
Figure 7:
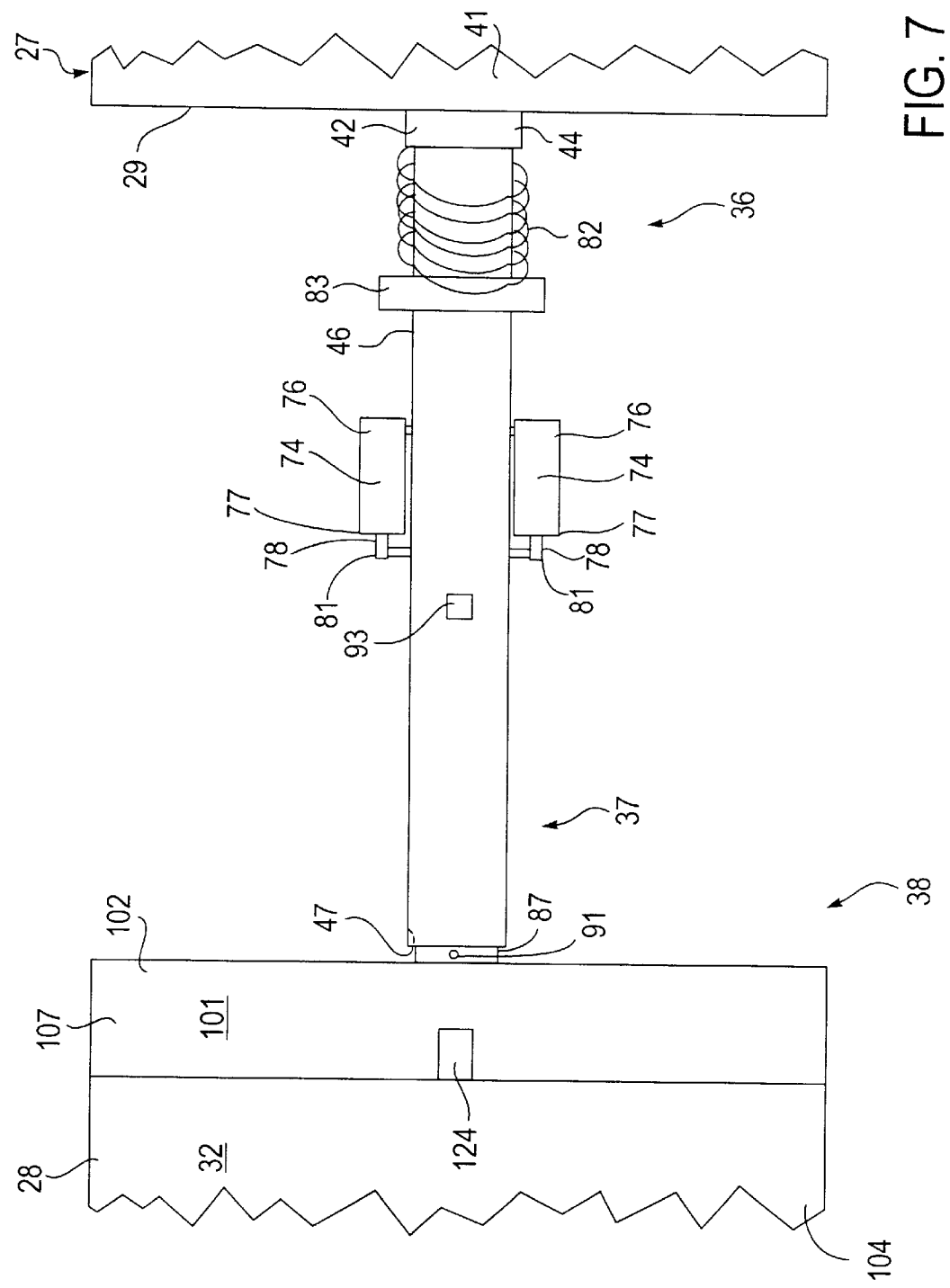
FIG. 7 is a top plan view taken along the line 7—7 of FIG. 6.

An elongate hook arm or drawbar 48 having proximal and distal extremities 49 and 51 and extending along a longitudinal axis is carried by and swivelably coupled to main member 46. Constructed of the same material as frame and main members 42 and 46, hook arm 48 is, preferably, solid and has a length ranging from 30 to 90 centimeters, preferably approximately 50 centimeters. The cross-sectional configuration of hook arm 48 is preferably rectangular, having a lesser dimension ranging from 20 to 40 millimeters, preferably approximately 25 millimeters, and a greater dimension ranging from 25 to 50 millimeters, preferably approximately 35 millimeters. Proximal extremity 49 of hook arm 48 is provided with a circular in cross-section transverse bore 52 extending therethrough and disposed approximately 2 centimeters from the most proximal end of proximal extremity 49 as shown in FIGS. 4 and 10. Bore 52 has a diameter ranging from 25 to 50 millimeters and, preferably, approximately 35 millimeters. Distal extremity 51 of hook arm 48 carries a cee-shaped coupling hook member 53 each leg of which is provided with a cross-sectional configuration similar to that of distal extremity 51 and which is formed integral therewith. Coupling hook 53 is configured so that, when coupled to main member 46, the lower leg 54 of cee-shape hook 53 extends distally from the end of distal extremity 51 of hook arm 48 with the concave portion 56 of coupling hook 53 oriented towards frame 41 of first vehicle 27. As such, the back or vertical portion 57 of the cee-shape of coupling hook 53 extends upward at a substantially ninety-degree angle relative to the longitudinal axis of hook arm 48 as shown in FIG. 4. Vertical portion 57 has a length ranging from approximately 5 to 10 centimeters and, preferably, approximately 7 centimeters. The upper leg 58 of cee-shaped coupling hook 48 also extends towards frame 41 along a longitudinal axis which is substantially parallel to the longitudinal axis of coupling hook arm 48 for a distance ranging from 4 to 8 centimeters and, preferably, for approximately 5 centimeters as shown in FIGS. 4–6.

A drawbar bracket 61 is welded or secured in any other appropriate manner to each side of the proximal portion of main member 46 for coupling hook arm 48 thereto as shown in FIGS. 4–10. Each bracket 61 is secured to main member 46 at an approximate distance ranging from 25 to 50 centimeters rearward of the distal end of frame member 42. Drawbar bracket 61 is preferably constructed of a material similar to that of drawbar 48 and is sized in order to extend inferiorly and at a substantially right angle to the longitudinal axis of main member 46 by a distance of approximately 5 to 10 centimeters and, preferably, approximately 7 centimeters. The most dependent portion 62 of each bracket 61 is provided with a transverse bore 63 extending therethrough. Bores 63 are transversely aligned with one another below main member 46 when brackets 61 are mounted thereto. Proximal end 49 of drawbar 48 is disposed below main member 46 and between brackets 61 so that bores 52 and 63 are transversely aligned whereby a hinge or swivel pin 64 which is sized to be frictionally disposed in aligned bores 52 and 63 is used to swivelably couple drawbar 48 to main member 46.

A drawbar guide 66 preferably constructed of material similar to the material of used for bracket 61 is welded or otherwise appropriately secured to the distal end of main member 46 as seen in FIG. 4. Guide 66 is provided with symmetrical arms 67 having distal extremities 68. Arms 67 are sized and configured to extend below and at a substantially right angle to the longitudinal axis of main member 46 by a distance ranging from approximately 10 to 20 centimeters and, preferably, approximately 12 centimeters. Thus configured, a slot or channel 69 is provided between arms 67 and extends from main member 46 to the distal extremities 68 of arms 67. When drawbar 48 is coupled to main member 46 by swivel pin 64, a segment of distal extremity 51 of drawbar 48 proximal to coupling hook 53 is slidably disposed in channel 69 as shown in FIG. 4.

Vertical movement of drawbar 48 within channel 69 is regulated or caused by lifting member 73. Lifting member 73 is preferably comprised of a conventional hydraulic cylinder 74 having proximal and distal ends 76 and 77 and a lifting arm 78 having proximal and distal extremities 79 and 81. Proximal end 76 of cylinder 74 is conventionally coupled to one external side of main member 46 distal to hinge 61. Proximal extremity 79 of lifting arm 78 is hydraulically coupled to distal end 77 of cylinder 74 and extends downwardly and distally thereof. Distal extremity 81 of lifting arm 78 is appropriately secured to proximal end 49 of drawbar 48 thereby completing the coupling of drawbar 48 to main member 46.

As hereinbefore described, the proximal portion of main member 46 is slidably, concentrically disposed within distal end 44 of frame member 42. A heavy duty spring member 82 constructed of a suitable material and provided with an appropriate tension is concentrically disposed around the outer proximal portion of main member 46 and limits inward motion of main member 46 within frame member 42 by biasing or urging main member 46 into full extension away from frame member 42. The proximal end of spring 82 is retained on main member 46 by distal end 44 of frame member 42. The distal end of spring 82 is retained at the appropriate position on main member 46 by dependent portions 62 of drawbar hinges 61 as well as by a restraining member or pin 83 mounted in an appropriate manner on the top of main member 46 as shown in FIG. 4. In order to limit the distal or rearward movement of main member 46, it can be sized so that the proximal end thereof is also provided with a flange, pins or another conventional modification (not shown). Distal end 44 of frame member 42 is provided with a corresponding circumferential, inwardly extending collar (not shown) by which the flange or pin on proximal end of main member 46 prevents main member 46 from sliding distally, completely out of frame member 42.

Hook assembly 37 further comprises a chock member 84 constructed of metal or other similar material, having proximal and distal extremities 86 and 87 and extending along a longitudinal axis. Chock member 84 is sized and configured so as to be concentrically, slidably or telescopically disposed within hollow core 47 of main member 46 as shown in FIGS. 4–10. Thus, the cross-sectional dimensions of chock member 84 are slightly less than the corresponding dimensions of main member 46. In addition, chock member 84 can either be solid or tubular. If tubular, the end of distal extremity 87 is provided with a cap, plug or other device (not shown) with which the distal end of chock member 84 is occluded.

During coupling and uncoupling of vehicles 27 and 32 or vehicles 32 and 33, proximal (forward) to distal (rearward) movement of chock member 84 within main member 46 is regulated by several means. Forward movement of chock member 84 is opposed or restrained by a chock spring 88 which is constructed of any suitable material such as metal, extends along a longitudinal axis and is coaxially disposed within hollow core 47 of main member 46. Proximally, chock spring 88 is seated against a circumferential, inwardly-extending collar or lip 89 which is conventionally mounted or integrally formed within main member 46. Distally, chock spring 88 abuts up against the end of proximal extremity 86 of chock member 84. Chock spring 88 is provided with an appropriate tension in order to urge chock member 84 in a rearward direction within main member 46. Distal extremity 87 of chock member 84 also carries one or more conventional chock stop pins 91 appropriately secured thereto by which forward movement of chock member 84 within main member 46 is limited as shown in FIG. 6. In addition, means (not shown) similar to that carried by the proximal end of main member 46 and distal end 44 of frame member 42 which prevent chock member 84 from sliding distally, completely out of main member 46 can be provided by sizing proximal extremity 86 of chock member 84 accordingly.

Forward movement of chock member 84 is also regulated and coordinated with movement of drawbar 48 during coupling and uncoupling. In this regard, a chock member restraining pin 92 is provided for limiting forward movement of chock member 84. Restraining pin 92 is constructed of an appropriate metal such as steel and is mounted with and coupled to means for deploying it in order to restrain chock member 84. Thus, a housing 93 is secured atop main member 46 at an appropriate position along the longitudinal axis thereof. Housing 93 is also made of an appropriate metal or plastic and is sized and configured so that it encloses and provides the frame which supports pin 92 and a conventional switch (not shown), such as a solenoid mechanism, pneumatic or hydraulic cylinder which is coupled to and by which pin 92 is activated. Solenoid switch is conventionally configured to be remotely controlled by the operator of lead vehicle 27 during the coupling and un-coupling process as hereinafter described. Within housing 93, pin 92 is disposed at a substantially right angle relative to the longitudinal axis of main member 46. The wall of main member 46 is provided with a transverse bore (not shown) situated beneath housing 93, extending through the wall and through which pin 92 extends into hollow bore 47 of main member 46 upon activation of the switch. Pin 92 is appropriately sized and configured so that, when fully extended into hollow bore 47 with proximal extremity 86 of chock member 84 being disposed rearward of pin 92, chock member 84 is prevented from moving forward within main member 46.

Movement of drawbar 48 is coupled to movement of chock member 84 by a limit switch 94 mounted in a switch housing 96 on the external wall of main member 46 (see FIG. 4). Beneath housing 96 the wall of main member 46 is provided with a small transverse bore (not shown) extending therethrough and through which limit switch 94 extends into hollow bore 47 of main member 46 at an appropriate position between collar 89 and retaining pin 92 as seen in FIG. 4. Switch 94 is, preferably, a conventional solenoid or other appropriate mechanism which is electrically coupled to lifting cylinder 74 so that when switch 94 is activated, for example by latch assembly 38 as hereinafter described, cylinder 74 causes lifting arm 78 to be withdrawn into cylinder 74 thereby causing angular movement of drawbar 48 towards main member 46. Switch 94 can also be configured to be controlled remotely by the operator of lead vehicle 27 during the coupling and un-coupling maneuvers as hereinafter described. For remote operation, both the switch controlling restraining pin 92 and the limit switch 94 are coupled through a conventional service bay (not shown) appropriately situated on lead vehicle 27 to controls (not shown) conveniently located within the cab of lead vehicle 27.

Coupling means 36 includes latch assembly 38 which, during the coupling process, is designed to couple or mate with hook assembly 37. Latch assembly 38 is mounted to front end 28 of trailing vehicle 32 as seen in FIGS. 4 and 5. More specifically, latch assembly 38 comprises an elongate plate 101 having forward and rear portions 102 and 103 and being constructed of a strong, durable material such as metal. Rear portion 103 is conventionally secured to or constructed integral with the front bumper or frame 104 of vehicle 32 and, preferably, is sized in order to extend laterally along substantially the entire width of the front of vehicle 32 as shown in FIG. 5. Thus, plate 101 has a width ranging from approximately 130 to 200 centimeters and, preferably, approximately 160 centimeters. Plate 101 extends along a longitudinal axis in a forward direction from vehicle 32 for a length ranging from approximately 10 to 20 centimeters and, preferably, approximately 12 centimeters.

Forward end 102 of elongate plate 101 is provided with a downwardly extending cee-shaped latch member 106 preferably formed integral with plate 101 as seen in FIG. 4. Latch member 106 is configured to be the complement or mate of coupling hook 53 so that each leg of latch member 106 is provided with a cross-sectional configuration similar to that of each corresponding leg of coupling hook member 53. In this regard, upper leg 107 of latch 106 is continuous and integral with forward end 102 of plate 101. The concave portion 108 of latch 106 is configured to face frame 104 of trailing vehicle 32. As such, the back or vertical rib portion 109 of cee-shaped latch member 106 extends downward at a substantially ninety-degree angle relative to the longitudinal axis of plate 101 for a length ranging from approximately 2 centimeters to 6 centimeters and, preferably approximately 3 centimeters. More importantly, as hereinbefore described, concave portion 108 of latch member 106 is sized and shaped to mate with concave portion 56 of coupling hook 53 during coupling of vehicles 27 and 32. Thus, the lower leg 111 of latch 106 also extends towards frame 104 of vehicle 32 along a longitudinal axis which is substantially parallel to the longitudinal axis of plate 101 for a distance ranging from approximately 2 centimeters to 6 centimeters and, preferably, approximately 4 centimeters as shown in FIG. 4.

The inferior or underneath face 112 of lower leg 111 of latch 106 is provided with means 113 for correcting lateral misalignment of hook and latch assemblies 37 and 38 occurring during the coupling process. Two symmetrically situated pawls 114 are swivelably coupled to underneath face 112 as shown in FIG. 10. Pawl 114 or elongate arm 114 is preferably constructed of metal or other appropriate material having an appropriate cross-sectional configuration. Extending along a longitudinal axis which is substantially perpendicular to the longitudinal axis of plate 101, arm 114 has lateral and medial extremities 116 and 117 and a length ranging from approximately 5 to 15 centimeters, preferably approximately 10 centimeters. Lateral extremity 116 is secured to face 112 by a conventional swivel or hinge pin 118. A pawl spring 119 provided with the appropriate tension is mounted to face 112 in front of medial extremity 117 of arm 114 as seen in FIG. 10. Spring 119 biases arm 114 in a rearward direction by urging arm 114 to swivel around pin 118. Rearward motion of arm 114 is limited by a stop peg 121 formed of a suitable material and secured to face 112 in a conventional manner. Peg 121 is appropriately positioned along the longitudinal axis of arm 114 and is also appropriately set off the axis in a rearward direction. Thus configured, arm 114 is provided with an operative angular range of motion for controlling alignment of vehicles 27 and 32 during coupling as hereinafter described.

Means 122 for permitting passengers or other non-human freight or cargo to move or be moved from one vehicle 22 to the other when coupled together during travel on the roadway 23 are carried by all vehicles 22. Front end 28 of bus is provided with a conventional passenger door (not shown). Rear end 29 of bus 22 is provided with a conventional flexible passageway 122 similar to the type used with extended, multi-car buses or passenger trains. Secured to the outside of rear end 29, passageway 122 encircles or encloses a door (not shown) through which passengers can enter passageway 122 for transfer from one bus 22 to another.

Transportation system 21 also includes means for guiding 123 and controlling the speeds of vehicles 22 during approach to one another, throughout the coupling process and during entrained travel thereafter. In one preferred embodiment, a servo-mechanism 123, including an imaging system 124 in the form of one or more video cameras or monitors 124 is carried by vehicle 22. Servo-mechanism 123 also includes a laser and/or radar guidance system 126 as shown in FIGS. 11 and 12. Thus, for controlling the coupling process, video monitor 124 and laser and/or radar 126 are mounted on front 28 and rear 29 of vehicle 22, preferably above latch and hook assemblies 37 and 38 respectively. Laser and/or radar 126 can be configured to measure the distance between coupling vehicles 22 up to hundreds of times per second and the relative speeds of the same up to several times per second. Video monitors 124 capture images of front and rear ends 28 and 29 of vehicles 22 throughout the coupling process.

Servo-mechanism 123 also includes means for registering 123 one or more markers 127 which have been secured to roadway 23 in any appropriate manner as seen in FIG. 1. Markers 127 can be in the form of laser- and/or radar-reflecting objects, a continuous line or, preferably, a combination thereof applied to roadway 23 in a pattern corresponding to the path of travel thereon. By providing vehicle 22 with additional side-mounted video monitors 124 and lasers and/or radars 126 and employing them as hereinbefore described the distance between vehicles 22 and a demarcated area of roadway 23 can be constantly evaluated in response to which travel of entrained vehicles 27 and 32 can also be guided and controlled.

Servo-mechanism 123 can be configured to effect semi- or complete automation of the entire coupling and uncoupling process, entrained travel of buses 22 or any portion thereof. In this regard, a computer system 128 is strategically and conveniently placed within the cab of vehicle 22 and utilized when vehicle 22 functions as lead vehicle 27. Input from systems 124 and 126 is directed to computer 128 which is programmed with software coupling computer 128 to speedometer 131 and to servomotors 132, 133 and 134 for controlling speed (acceleration 132 and braking 133) and steering 134 of vehicle 22 as seen in FIGS. 11 and 12. In addition, computer 128 in lead vehicle 27 can be enabled to communicate with and control computers 128 in trailing vehicles 22 by means of conventional wireless technology. In this manner, servo-mechanism 123 is also capable of providing remote control means for partially or completely operating vehicles 22.

When serving as lead vehicle 27, in addition to being the primary user of guiding means 123, vehicle 22 carries means for propelling 128 trailing vehicle 32 during travel together. Thus, bus 22 is provided with the engine 128 and fuel capacities required to tow a train or series of vehicles 22 an appropriate distance for an appropriate duration prior to refueling. Vehicle 22 can also be adapted for in transit re-fueling from a fuel tanker.

Operation and use of transportation system 21 of the present invention can now be described in conjunction with the accompanying figures as follows. Let it be assumed that a transit authority has decided to establish a mass transportation system within its jurisdiction and has selected transportation system 21 of the present invention. In preparation therefore, markers 127 are applied to roadways 23 to be used with system 21. Buses 22 are purchased and/or retrofitted as necessary in order to be sufficiently adapted for use with system 21 as hereinbefore described. Employees are hired and trained to operate buses 22 during conventional use and throughout the coupling process. An operating plan is promulgated throughout the communities to be served by system 21. Included in the operating plan are itineraries and schedules for lead vehicles 27 as well as subsidiary routes and times for buses 22 feeding into main roadways 23 in order to be entrained with lead vehicles 27.

Let it further be assumed that preparations have been completed and transit system 21 is operational. At the beginning of a daily schedule, lead vehicle 27 is provided with an operator who, while picking up passengers along the route, drives and directs bus 27 in a conventional manner from the main terminal at the transit authority to first lane 24 of primary roadway 23. Upon entering roadway 23, the operator accelerates as necessary, moves into lane 24 and brings lead bus 27 up to an appropriate constant speed of travel up to and in accordance with legal speed limits for high speed vehicular travel on open highways. Preferably, barring unforseen technical problems, emergencies and except for driving bus 27 back to the terminal upon completion of the schedule, the operator of lead bus 27 maintains a substantially constant speed and position of bus 27 within lane 24 throughout the duration of its schedule. As hereinbefore described, this can be monitored and corrected based upon input from servo-mechanism 123. Thus, constantly updated data from video monitors 124 and distance lasers and/or radars 126 assessing the position of bus 27 relative to roadway 23 markers 127 provides the operator of bus 27 and servo-motor with the means to make adjustments, either manually, automatically or in concert as seen in FIGS. 11 and 12. Indeed, computer 128 can also be enabled for remote control by the main terminal. In this manner, while intermittently coupling and un-coupling to trailing buses 22, lead bus 27 continually repeats its looped route. In the case of a route using a non-looped roadway, operator does have to slow and reverse direction of bus 27 at each end of the route.

Let it now be assumed that while bus 27 is proceeding at a substantially constant velocity in lane 24 of roadway 23 bus 32 has also been provided with an operator, started its subsidiary route from the terminal and has picked up passengers. Based upon schedules and, where helpful, radio contact with bus 27 and/or the terminal, the operator of bus 32 proceeds to main roadway 23 in anticipation of meeting and coupling with bus 27. Accelerating to an appropriate velocity, bus 32 is merged onto roadway 23 and into lane 25 as seen in FIG. 1. Adjusting accordingly, the operator of bus 32 next merges vehicle 32 into lane 24, positioning it behind bus 27. Once bus 32 has approached within an approximate distance of rear 29 of bus 27, for example, approximately 100 feet, the operator of bus 32 adjusts the speed so that it becomes substantially equivalent to that at which bus 27 is traveling.

At this juncture, the operator of bus 32 gives notice that bus 32 is prepared to couple with bus 27. This can be accomplished by one or more of several maneuvers. Vehicle 22 can be fitted with external signal lights at front and rear 28 and 29 (not shown) which can be activated by the operator of trailing bus 32, thus indicating to the operator of leading bus 27 the readiness of bus 32 to couple. Alternatively or in addition thereto, radio communication can be used between operators of leading and trailing vehicles 27 and 32 and the terminal to coordinate coupling processes throughout the transit system grid.

Once operators of leading and trailing vehicles 27 and 32 acknowledge that both are prepared to couple, preparation for the final stages of the coupling process can be made. In this regard, if not already online, computers 128 on buses 27 and 32 are booted. All video monitors 124 and distance lasers and/or radars 126 on buses 27 and 32 are switched on. Radio communication between operators of leading and trailing vehicles 27 and 32 can also be instituted or maintained. In addition, the operator of lead vehicle 27 confirms via the controls in the cab of bus 27 that limit switch 94 has been activated and that chock member restraining pin 92 has been switched into the retracted position thereby leaving hollow bore 47 of main member 46 unimpeded.

Figure 8:
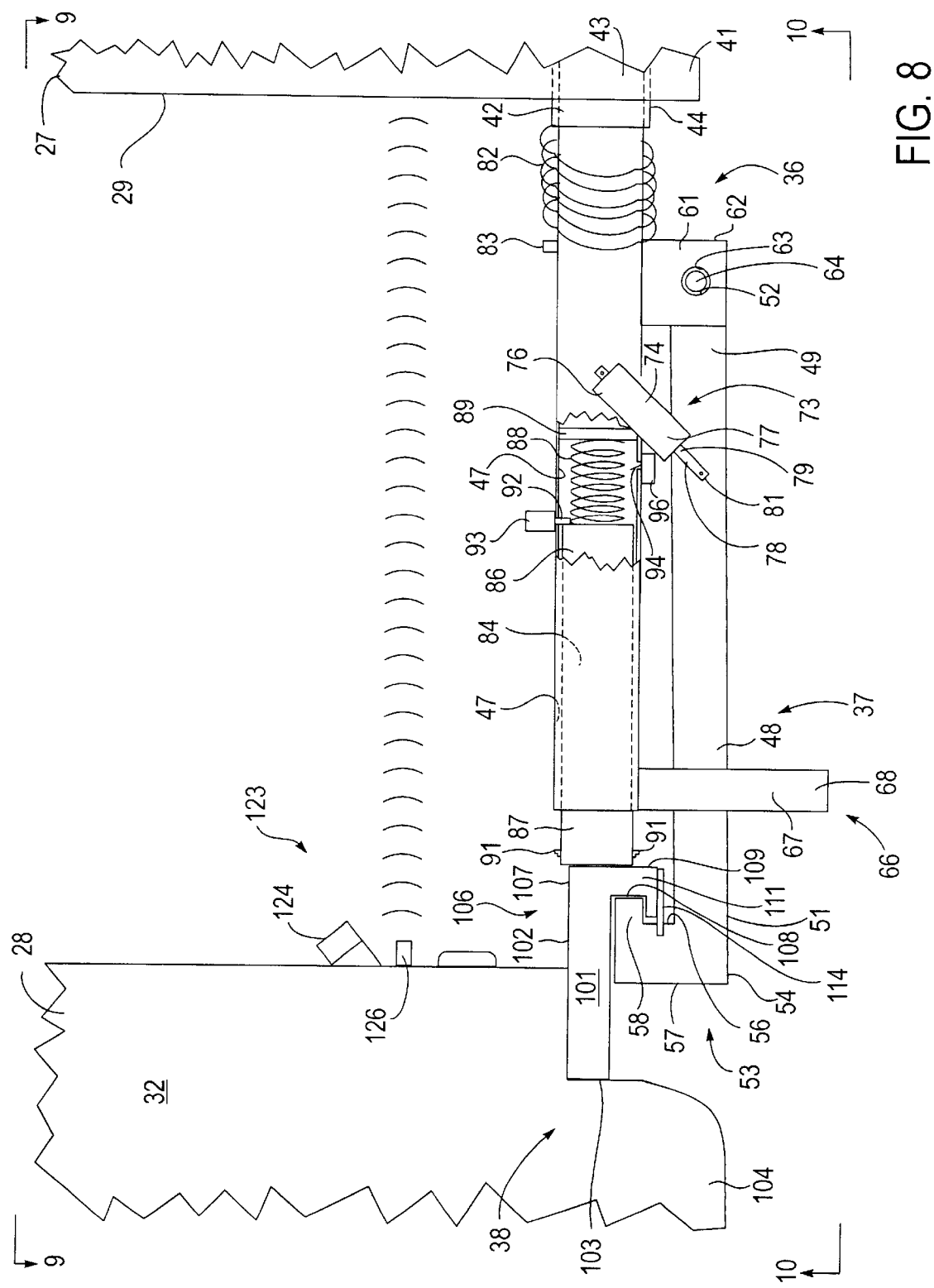
FIG. 8 is a side elevational view similar to FIG. 6 with the two vehicles securely coupled together.
Figure 9:
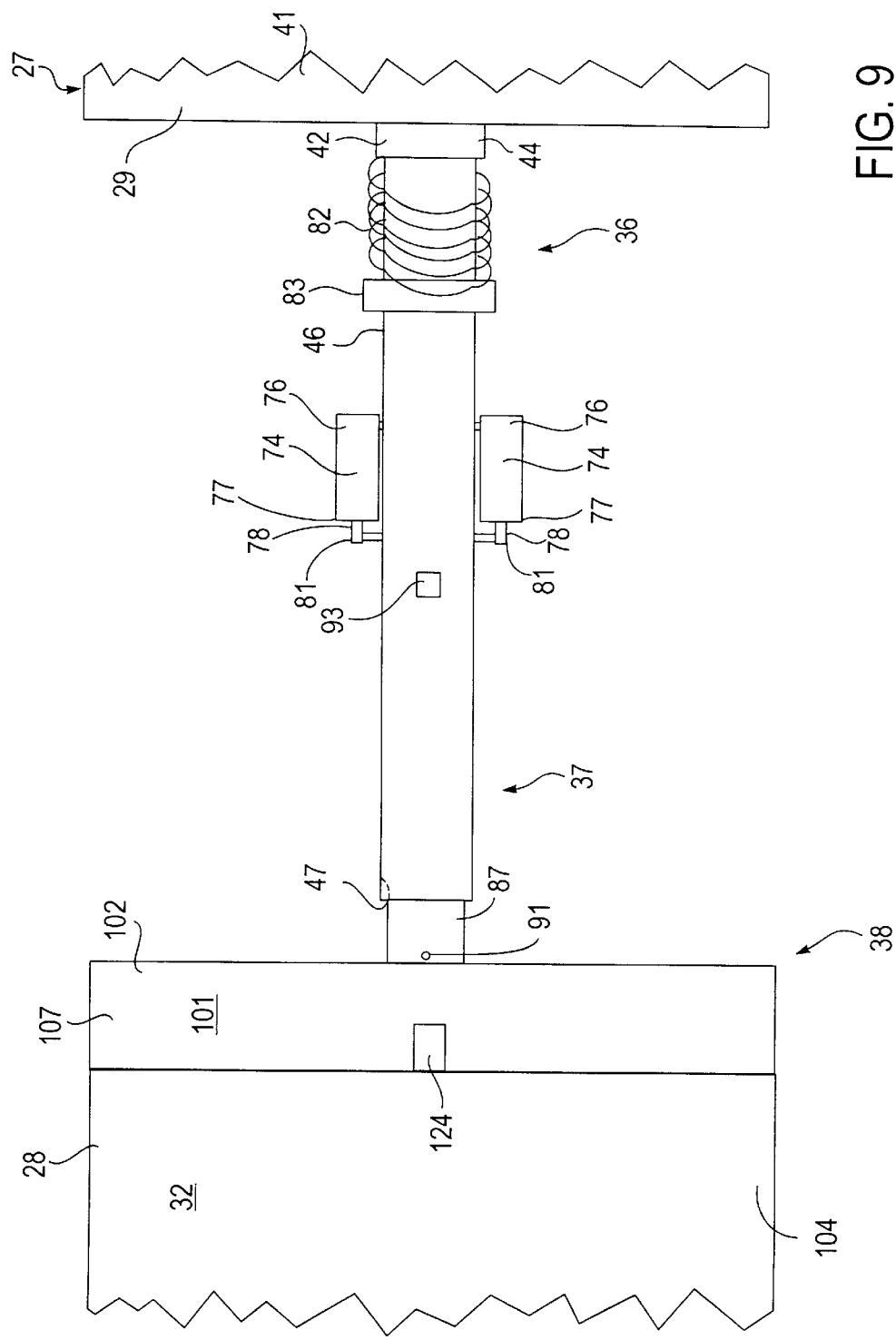
FIG. 9 is a top plan view taken along the line 9—9 of FIG. 8.

In the case of a manually directed procedure, after the foregoing preparations have been completed the operator of trailing bus 32 gradually accelerates, inching front 28 of bus 32 closer to rear 29 of bus 27 while adjusting the speed of and guiding bus 32 as necessary, based upon constant input from guiding means 123. When front 28 of bus 32 contacts rear 29 of bus 27, rib portion 109 of latch member 106 of latch assembly 38 strikes distal extremity 87 of chock member 84 which is thereby driven forward within hollow core 47 of main member 46 as shown in FIGS. 4 and 6. As proximal extremity 86 of chock member 84 slides forward, its motion is controlled and limited by chock spring 88 as hereinbefore described. When proximal extremity 86 of chock member 84 trips activated limit switch 94, drawbar 48 is caused to move upward towards main member 46 and into a substantially horizontal position as shown in FIG. 6. At this point, coupling hook 53 of drawbar 48 has loosely engaged latch member 106 of latch assembly 38 but is not securely coupled thereto. Observing the foregoing on video monitors 124, the operator of trailing bus 32 gradually decelerates his vehicle 32 thereby causing latch assembly 38 to move slightly rearward of hook assembly 37 and to temporarily release its pressure against distal extremity 87 of chock member 84. With the deceleration, coupling hook 53 and latch member 106 become more closely mated as seen in FIG. 8. In addition, chock spring 88 is enabled to drive the proximal extremity 86 of chock member 84 distal to restraining pin 92. Upon video confirmation that this has occurred, the operator of leading bus 27 activates the switch for pin 92 causing it to be extended into hollow bore 47 of main member 46, thus securing chock member 84 in place. This maneuver secures longitudinal coupling of hook and latch assemblies 37 and 38. It should be appreciated that, in addition or as an alternative to video confirmation that proximal extremity 86 of chock member 84 has been driven distal to restraining pin 92, other appropriate means such as a mechanical or electrical switches can be utilized for confirmation thereof.

Securing lateral alignment of leading and trailing vehicles 27 and 32 is the final step in the coupling process. By constantly evaluating input from guiding means 123 and, in particular, by viewing input from video monitors 124 on rear 29 of lead vehicle 27 and front 28 of trailing vehicle 32, the operator of vehicle 32 begins to slowly, laterally align his vehicle with leading vehicle 27. In so doing, coupling hook 53 is caused to slide medially along lower leg 111 towards the center of latch 106. As hook 53 slides medially, it contacts medial extremity 117 of pawl 114 closest to it. Continued medial movement of hook 53 forces pawl 114 to swivel forward thereby compressing corresponding pawl spring 119. Once hook 53 slides medially off of pawl 114, compressed pawl spring 119 urges pawl 114 back into its fully rearward position thereby limiting lateral travel of hook 53 in the opposite direction. Moreover opposite pawl 114, which has remained biased into its fully rearward position by corresponding pawl spring 119, prevents further travel of hook 53 in the direction from which it has come thereby locking hook 53 into a central position between symmetrically extended pawls 114 as shown in FIG. 10. Secure coupling is now complete. Trailing bus 32 either turns off or idles its engine while it is propelled and guided by lead vehicle 27 during coupling thereto. Thereafter, passageway 122 is secured between coupled vehicles 27 and 32 enabling passengers to move from one bus 22 to another.

In the case of semi- or fully automated coupling, servomechanism 123 automatically adjusts speed and steering of vehicles 27 and 32 by use of servo-motors 132–134 as hereinbefore described. In the case of remote automated coupling, servo-mechanism 123 is operated by the main terminal.

It should be appreciated that, in addition to the foregoing preferred embodiment, other variations and embodiments of the coupling assembly are considered within the purview of the present invention.

In order to uncouple trailing bus 32 from the train the coupling steps are, essentially, simply reversed. Thus, once operators of buses 27 and 32 acknowledge their readiness to uncouple (by communicating with radio, computer or other signaling means), the engine of trailing bus 32 is started if necessary. The operator of leading bus 27 activates the switch for pin 92 causing it to be retracted out of hollow bore 47 of main member 46 and releasing chock member 84. If not done earlier, the operator of lead bus 27 de-activates limit switch 94. In the case of a manual procedure, the operator of trailing bus 32 subsequently accelerates slightly whereby latch member 106 urges chock member 84 against chock spring 88. In so doing, latch member 106 and coupling hook 53 become partially dis-engaged by becoming un-mated. Drawbar 48 is thus permitted to passively rotate downward, away from latch assembly 38 whereupon trailing bus 32 can decelerate, pull away from leading bus 27 out of first lane 24 and merge into lane 25. From that position, bus 32 is able to exit main roadway 23 in order to complete one or more subsidiary routes assigned to it. The un-coupling process may also be automated by essentially reversing the manner in which servo-mechanism 123 is employed in the coupling process.

It should be appreciated that, with linear configuration 35, one method for un-coupling a trailing bus 32 which is leading other buses 33 and 22 would be as follows. The initial un-coupling procedure for bus 32 from leading bus 27 would be un-changed. In addition, trailing bus 33 would un-couple from bus 32 by a similar procedure and subsequently re-couple to leading bus 27 by effecting a similar coupling procedure. During these maneuvers, bus 33 would temporarily serve as a lead vehicle for any additional buses entrained behind it.

Figure 13:
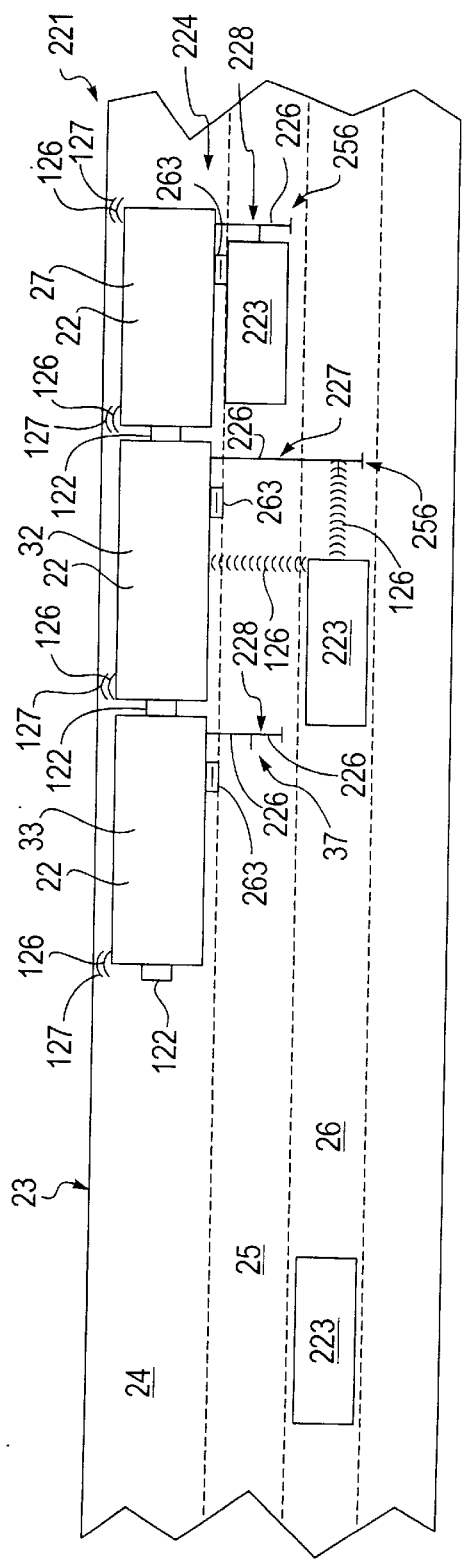
FIG. 13 is a top plan view, similar to a portion of FIG. 1 of another embodiment of the dual mode transportation system of the present invention.

Another embodiment of the present invention is shown in FIGS. 13 and 15–16. Transportation system 221 is similar to system 21. Thus, identical numbers are used for elements common to both systems 21 and 221.

In addition to including substantially all elements of system 21, system 221 comprises coupling or cooperative means 222 carried by each vehicle 22 for coupling an additional vehicle 223 in a parallel configuration or orientation 224 thereto. More specifically, vehicle 22 carries an elongate arm apparatus 226 which extends substantially parallel to roadway 23 along a longitudinal axis which is at a substantially right angle relative to the longitudinal axis of vehicle 22. Arm 226 is capable of assuming extended and retracted positions 227 and 228 which are lateral and apposed to vehicle 22 respectively. The front end of vehicle 223 is provided with latch assembly 38 identical to that provided for front end 28 of vehicle 22.

Arm 226 further comprises inboard, intermediate and outboard members 229, 231 and 232. Outboard member 232 is sized and shaped to be concentrically and slidably or telescopically disposed within intermediate member 231 and intermediate member 231 is configured to be similarly disposed within inboard member 229 as seen in FIGS. 15 and 16.

Inboard member 229 includes upper and lower elongate tubular rail elements 233 and 234 constructed of an appropriate material such as steel. Each inboard rail element 233 and 234 has proximal and distal extremities 236 and 237, a length ranging from approximately 60 to 120 inches, preferably approximately 96 inches and a width ranging from 30 to 50 inches, preferably approximately 40 inches. Rail element 233 and 234 is rectangular in cross-section with a width ranging from approximately 3 to 8 inches and, preferably, approximately 5 inches. One face of each inboard rail element 233 and 234 carries a slot 235 extending the length thereof. Proximal extremity 236 of upper inboard rail element 233 is mounted to the starboard side of front end 28 of vehicle 22 with slot 235 facing downward and at a distance above the ground ranging from 6 to 18 inches and, preferably, approximately 12 inches. Lower inboard rail element 234 is mounted to vehicle 22 with slot 235 facing upper rail element 233 and at approximately 40 to 60 inches below upper rail element 233. Each inboard rail element 233 and 234 is coupled to vehicle 22 in a conventional, appropriate manner whereby arm 226 is rendered capable of withstanding buffeting forces sustained during travel on roadway 23 while remaining securely in an operative position. In this regard proximal extremity 236 of inboard member 229 is secured to vehicle 22 with spring or other universal coupling means (not shown) for accommodating excessive torquing forces in all directions during travel.

Intermediate member 231 similarly includes upper and lower elongate tubular rail elements 238 and 239 each having proximal and distal extremities 241 and 242. Preferably, each intermediate rail element 238 and 239 is constructed by welding or otherwise appropriately securing together the non-slotted faces of two elements similar to those used in constructing inboard member 229 as shown in FIGS. 15 and 16.

Outboard member 232 is a tubular structure having proximal and distal extremities 243 and 244 and constructed of steel or any other appropriate material. Preferably having a length and width substantially equivalent to that of inboard rail elements 233 and 234, outboard member has a rectangular in shape cross-section with upper and lower faces 246 and 247, each of which is provided with a longitudinal slot 235 extending the length thereof as hereinbefore described. The depth or distance between upper and lower faces 246 and 247 of outboard member 232 corresponds to slightly less than the distance between upper and lower rail elements 238 and 239 of intermediate member 231. By extruding or otherwise providing upper and lower partition shelves 248 and 249 within hollow core 251 of outboard member 232, a channel or track 252 is provided adjacent and bounded by each internal face 246 and 247 thereof. Shelves 248 and 249 are structured so that each track 252 of outboard member 232 has a configuration identical to channel or track 252 formed within each rail element 233, 234, 238 and 239.

Guide wheels 253 are provided for slidably coupling inboard, intermediate and outboard members 229, 231 and 232 to one another. Guide wheel 253 is constructed of steel or other appropriate material and is shaped and sized in order to be rotatably and slidably disposed within channel or track 252. To that end, wheel 253 is rotatably coupled to a stem or axle 254. Stem 254 is appropriately fixed within track 252 and extends at a substantially right angle to the longitudinal axis of arm 226 out of slot 235 so that guide wheel 253 is mounted on axle 254 immediately adjacent to and outside of slot 235. Distal extremity 237 of each inboard rail element 233 and 234 is provided with one stem 254 and wheel 253. Each proximal and distal extremity 241 and 242 of intermediate rail elements 238 and 239 is provided with stem 254 and guide wheel 253 in opposing tracks 252. Thus, proximal extremity 241 of upper intermediate rail element 238 carries stem 254 in track 252 facing upper inboard rail element 233 while distal extremity 242 carries stem 254 in track 252 facing lower inboard rail element 234. Lower intermediate rail element 239 is provided with the symmetrical configuration of guide wheels 253. Thus, wheels 253 carried by inboard member 229 are disposed within adjacent corresponding tracks 252 of intermediate member 231 and vice-versa for wheels 253 carried in proximal extremities 241 of intermediate rail elements 238 and 239 as seen in FIGS. 15 and 16. Guide wheels 253 and stems 254 are similarly mounted to proximal extremity 243 of outboard member 232. As such, wheels 253 carried by distal extremities 242 of intermediate rail elements 238 and 239 are disposed within track 252 of outboard member 232 while wheels 253 carried by proximal extremity 243 of outboard member 232 are disposed within track 252 of intermediate member 231.

Distal extremity 244 of outboard member 232 is coupled to a support assembly 256 for supporting arm 226 during travel on roadway 23 as seen in FIGS. 15–16. Support assembly 256 comprises a head tube 257 which is constructed of a material similar to that of outboard member 232. Head tube 257 has a length which is approximately equal to the depth of outboard member 232, a cross-sectional diameter ranging from 20 to 40 centimeters and, preferably, approximately 30 centimeters and a wall thickness ranging from 1 to 2 centimeters and, preferably, approximately 1.5 centimeters. A caster assembly 258 including a support wheel 258 with a conventional rubber tire and a wheel frame 259 in which wheel 258 is rotatably mounted are conventionally, swivelably coupled to head tube 257. Caster assembly 258 can be provided with means (not shown) for controlling the amount of swivel wheel frame 259 and wheel 258 are permitted during operation. Head tube 257 is appropriately secured to the lateral end of outboard member 232 by any appropriate means such as by being welded or bolted thereto.

Means 261 for extending and retracting arm 226 is coupled to vehicle 22 and distal outboard member 232. Extending and retracting means 261 preferably includes a conventional hydraulic cylinder 261 appropriately secured to the starboard side of front end 28 of vehicle 22 and distal extremity 244 of outboard member 232 as seen in FIGS. 15 and 16.

Coupling means 222 further comprises a conventional bracket 262 or other appropriate means for securing hook assembly 37 thereto. Thus, the mid-section of outboard member 232 is provided with an appropriate bracket 262 to which hook assembly 37 is mounted.

Arm 226 can be operated manually or automatically during the coupling and un-coupling process. In this regard, electrical coupling of hydraulic cylinder 261 to controls (not shown) located in the cab of lead vehicle 27 is as hereinbefore described. For automatic and remote operation of arm 226, hydraulic cylinder 261 is appropriately coupled to servo-mechanism 123.

Secondary or additional means 263 for permitting passengers or non-human freight or cargo to move or be moved from vehicle 22 to vehicle 223 when coupled together during travel on roadway 23 is carried by vehicle 22 in the form of a conventional flexible passageway 263 similar to that carried by rear end 29 of vehicle 22. Passageway 263 is secured to the starboard side of vehicle 22 rearward of arm 226. The side of vehicle 223 is provided with a conventional passenger door similar to that carried by front end 28 of vehicle 22 which couples with passageway 263 for passenger and/or freight transfer between vehicles 22 and 223 as seen in FIG. 13.

Additional video monitors 124 and distance lasers and/or 126 are mounted on the starboard side of vehicle 22, arm 226 and on vehicle 223 as shown in FIG. 13. These are appropriately coupled to controls in vehicle 22 and to servo-mechanism 123. Vehicle 223 is similarly provided with means of establishing radio contact with vehicle 22 and the terminal.

Operation and use of transportation system 221 can now be described with the accompanying figures as follows. Let it be assumed that system 221 has been in operation as hereinbefore described in conjunction with system 21. Let it be further assumed that the operator of vehicle 223 has similarly merged onto roadway 23 and into lane 26 and thereafter wishes to couple in a parallel orientation to the linearly entrained vehicle 22 traveling on roadway 23. While vehicle 22 proceeds at a substantially constant velocity in lane 24 of roadway 23, vehicle 223 accelerates in lane 26 until it approaches within approximately 100 feet of front 28 of vehicle 22 while remaining substantially parallel thereto. In the case of manual deployment, after appropriate signaling and/or radio communication between operators of vehicles 22 and 223, arm 226 is extended lateral of vehicle 22, towards and in front of vehicle 223. During extension and retraction of arm 226, caster assembly 258 permits substantially passive steering and movement of wheel frame 259 and support wheel 258 in order to accommodate lateral torque forces placed upon arm 226 and wheel 258. Coupling of latch assembly 38 on vehicle 223 to hook assembly 37 on bracket 262 of arm 226 is as hereinbefore described in conjunction with coupling of vehicles 22 of system 21. After coupling to arm 226, arm 226 is pulled into the retracted configuration 228 so that vehicle 223 is directed from lane 26 into lane 25 and immediately lateral of vehicle 22. Prior to uncoupling, arm 226 is, once again, extended laterally into the fully extended configuration 227 thereby moving vehicle 223 back into lane 26. Un-coupling is subsequently effected as hereinbefore described.

In addition to automatic operation of arm assembly 226, the entire coupling and un-coupling process involving vehicles 22 and 223 can be automated by use of servo-mechanism 123 in a manner consistent with that of system 21.

Figure 14:
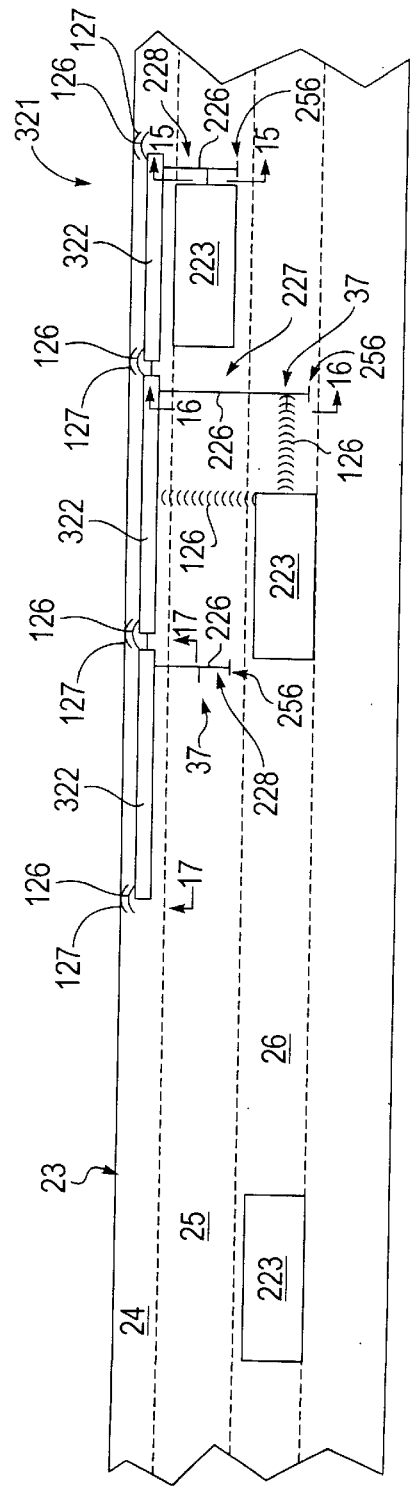
FIG. 14 is a top plan view similar to FIG. 13 of another embodiment of the dual mode transportation system of the present invention.

Another embodiment of the present invention is shown in FIG. 14. Transportation system 321 is similar to system 221. Thus, identical numbers are used for elements common to both systems 221 and 321.

Figure 17:
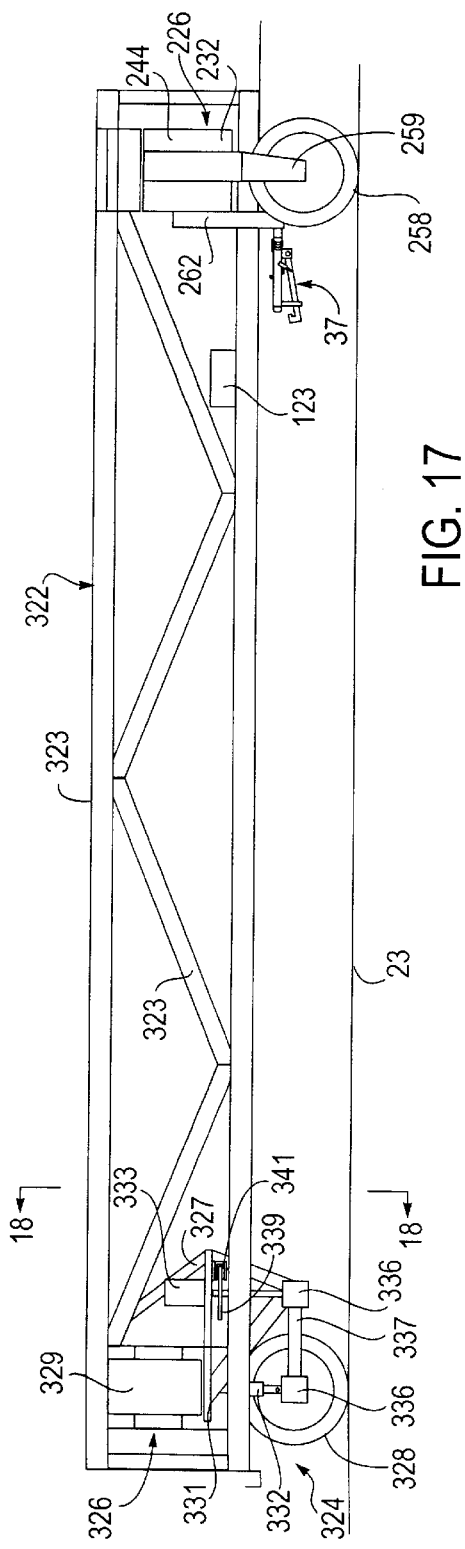
FIG. 17 is an enlarged side elevational view of the towing dolly taken along the line 17—17 of FIG. 14.

System 321 includes substantially all elements of system 221 except for linearly entrained vehicles 22 of system 221. In lieu thereof, system 321 is provided with at least one towing vehicle, trailer or dolly 322 which is capable of being linearly coupled to identical dollies 322 and laterally coupled to drive vehicle 223. More specifically, towing dolly 322 comprises a frame 323 constructed of an appropriate heavy duty material such as tubular steel. Alternatively, frame 323 can be constructed of multiple i-beams or tubular segments, similar to scaffolding, coupled to one another as shown FIG. 17. Frame 323 has a length ranging from approximately 20 to 80 feet, preferably approximately 30 feet, and a width ranging from approximately 7 to 12 feet, preferably approximately 9 feet.

Figure 19:
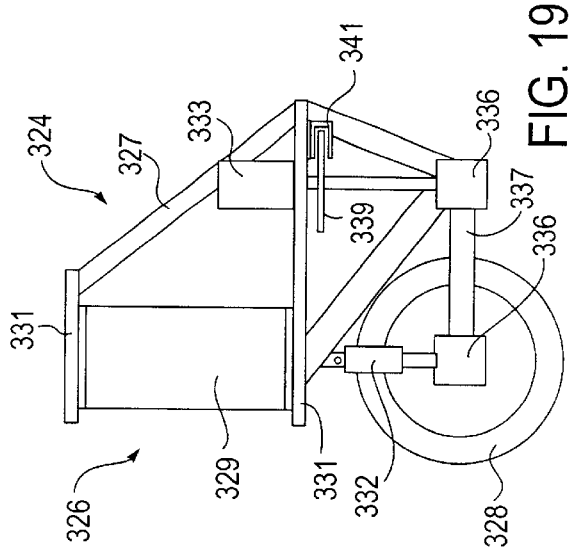
FIG. 19 is a view of the drive assembly of the towing dolly taken along the line 19—19 of FIG. 18.
Figure 18:
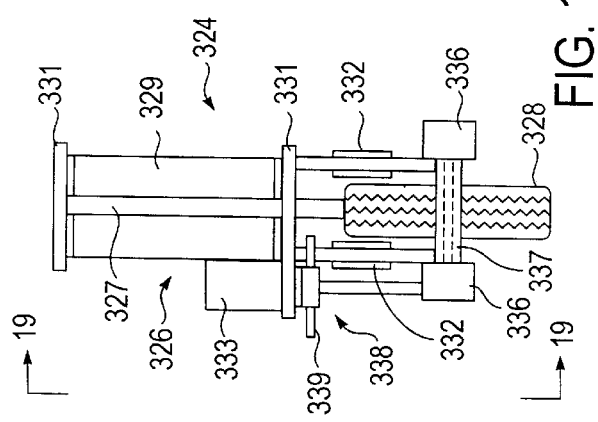
FIG. 18 is an enlarged front elevation view of the drive assembly of the towing dolly of FIG. 17 taken along the line 18—18 of FIG. 17 and with the dolly frame removed.

Dolly 322 carries a plurality of conventional drive assemblies 324 by which it is supported and steered. Drive assembly 324 includes a steering sub-assembly 326 comprising a brace frame 327 to which a conventional wheel and tire unit 328 is rotatably coupled as shown in FIGS. 18–19. Brace frame 327 is swivelably coupled to frame 323 of dolly 322 by a swivel housing 329 and swivel member or plate 331. Swivel housing 329 is, preferably, a cylindrically shaped metal canister 329 which is secured to frame 323 in any appropriate manner. Swivel member 331, which is either secured to brace frame 327 or formed integral therewith, is also constructed of an appropriate metal material and is configured to be concentrically and rotatably disposed within swivel housing 329 by use of conventional races and bearings (not shown). Drive assembly 324 is also equipped with shock absorbers or springs 332 and thrust bearings (not shown) for accommodating vertical displacement of wheel unit 328 during travel on roadway 23.

Lead towing dolly 324 can be provided with an independent power source or drive mechanism 333. Drive motor 333 is mounted to brace frame 327 or frame 323 of dolly 322 and conventionally coupled to wheel unit 328 by use of independent, multiple right angle gear boxes 336 and drive shafts 337 as shown in FIGS. 18–19. Drive mechanism 333 can also be provided with conventional means for braking 338 in the form of disc brakes 339 and brake calipers 341 suitably coupled to any one of a number of elements of drive mechanism 333.

Towing dolly 322 can be manually, automatically or remotely operated by enabling servo-mechanism 123 in a manner consistent with that of transportation systems 21 and 221. Thus, in order to automatically steer towing dolly 322, steering sub-assembly 326 carries a hydraulic steering cylinder (not shown) appropriately coupling brace frame 327 to frame 323 of dolly 322. Hydraulic cylinder, drive mechanism 333 and braking means 338 are conventionally coupled to servo-mechanism 123 as hereinbefore described. In this regard, dolly 322 is provided with system hardware and computer software identical to that included with systems 21 and 221.

Drive mechanism 333 can also be configured with means for being coupled or connected to an external power source such as an electrified guide rail or wire member or system carried by roadway 23. Alternatively, towing dolly 323 can be coupled to lead vehicle 27 and propelled thereby. Operation of system 321 is otherwise similar to that of system 221.

It should be appreciated that variations and modifications of the preferred embodiments disclosed herein are within the purview of the present invention. For example, trains carrying coupling arms can be substituted for buses in the case of parallel coupling configurations. Additional substitutions can vary the type and number of linearly entrained vehicles. Automobiles may be adapted to be linearly entrained with one another or with one or more buses or trains. Means established for transferring or moving non-passenger cargo or freight between the vehicles can be adapted for either manual, semi-automatic or fully automated control. Such freight management can also be controlled and directed remotely. In some cases, passenger travel between vehicles becomes unnecessary. Roadway 23 can also be provided with means for semi- or fully automatically propelling and/or steering any train of vehicles or towing dollies such as by use of a track, rail or trolley mechanism. In such an embodiment, the track, rail or trolley mechanism would preferably be located immediately adjacent the fast lane of the roadway in either a separate, dedicated lane or shoulder specific therefor. In the case of a rail, trolley or track utilized with a towing dolly for example, the dedicated lane could be constructed so that it is smaller than a conventional roadway lane as seen with dolly lane 24 in FIG. 14.

In addition, the support assembly for the coupling arm used with parallel coupling systems can be independently powered in order to more efficiently handle forces sustained thereby during operation. Furthermore, a coupling arm can be provided which is capable of retracting and folding alongside of the vehicle carrying it when not in use.

From the foregoing, it is evident that a novel mass transit system has been described. The system of the present invention offers a cost-effective, fuel-efficient, environmentally sound and user-friendly alternative to existing mass transit systems. Capable of using adapted vehicles in either a conventional manner, entrained together or by combining these methods of use, the dual-mode transportation system of the present invention affords a transit authority the ability to expand and adapt to growing and changing needs of the communities it serves.

What is claimed is:

1. A transportation system for use on an expressway having first and second lanes comprising a lead expressway vehicle adapted for travel on the expressway, a passenger expressway vehicle separate from the lead vehicle having land-engaging wheels and adapted for picking up passengers from stops and means for coupling the passenger vehicle to the lead vehicle while the lead vehicle and the passenger vehicle are traveling on the expressway so that the passenger vehicle travels with the lead vehicle on the expressway.

2. A transportation system as in claim 1 wherein the means includes means for decoupling the passenger vehicle from the lead vehicle while the lead vehicle and the passenger vehicle are traveling on the expressway.

3. A transportation system as in claim 1 wherein the means includes a hook and latch assembly.

4. A transportation system as in claim 1 wherein the passenger vehicle is an automobile.

5. A transportation system as in claim 1 wherein the passenger vehicle is a bus.

6. A transportation system as in claim 1 wherein the lead vehicle and the passenger vehicle are each buses, a passageway carried by at least one of the buses for permitting passenger travel between the buses while the buses are coupled together and traveling on the expressway.

7. A transportation system as in claim 1 wherein the coupling means includes a trailer adapted for travel on the expressway and coupled to the lead vehicle and cooperative means carried by the trailer and the passenger vehicle for coupling the passenger vehicle to the trailer while the lead vehicle and the passenger vehicle are traveling at high speeds on the expressway.

8. A transportation system as in claim 7 wherein the trailer is for travel in the first lane and includes an arm extendable sideways of the trailer into the second lane, the cooperative means carried in part by the arm for permitting the passenger vehicle to couple to the arm in the second lane.

9. A transportation system as in claim 1 wherein the coupling means includes a railcar adapted for travel on a railway disposed adjacent the first lane of the expressway, the railcar having a portion extending over the first lane and cooperative means carried by the portion of the railcar and the passenger vehicle for coupling the passenger vehicle to the railcar while the lead vehicle and the passenger vehicle are traveling on the expressway.

10. A transportation system for use on a roadway comprising separate first and second rubber-tired vehicles adapted for travel on the roadway at variable speeds of up to at least speeds typical for highway vehicular travel and a coupling assembly for coupling said first and second vehicles to one another while the first vehicle is traveling at any of said highway variable speeds.

11. A transportation system as in claim 10 wherein the coupling assembly includes means for orienting said first and second vehicles in a linear configuration with respect to one another.

12. A transportation system as in claim 10 wherein the coupling assembly includes means for orienting said first and second vehicles in a parallel configuration with respect to one another.

13. A transportation system as in claim 12 wherein said orienting means includes a member carried by and extendable lateral of said first vehicle, said second vehicle being coupleable to said member in the extended configuration.

14. A transportation system as in claim 12 further including means for operating said first vehicle remotely.

15. A transportation system as in claim 14 wherein said remote operating means includes a guide member carried by the roadway and provided with electrical power, means for electrically coupling the first vehicle to said guide member and a computer system for governing the flow of electricity from the guide member to the first vehicle.

16. A transportation system as in claim 10 further including means carried by the first vehicle for propelling the second vehicle while said first and second vehicles are coupled.

17. A transportation system as in claim 10 further including means carried by the first vehicle for guiding the second vehicle while said first and second vehicles are coupled.

18. A transportation system as in claim 17 wherein said guiding means includes means for registering one or more markers on the roadway and steering said first and second vehicles relative to said markers.

19. A transportation system as in claim 18 wherein said registering means includes a laser guidance system.

20. A transportation system as in claim 18 wherein said registering means includes a video-imaging system.

21. A transportation system for use on a roadway comprising first and second vehicles adapted for travel on the roadway at variable speeds of up to at least speeds typical for highway vehicular travel, a coupling assembly for coupling said first and second vehicles to one another while the first vehicle is traveling at any of said highway variable speeds and means carried by the first and second vehicles for permitting passasengers to be moved between the first and second vehicles when said first and second vehicles are coupled.

22. A transportation system as in claim 21 wherein the first and second vehicles are each buses.

23. A transportation system for use on a roadway comprising first and second vehicles adapted for travel on the roadway at variable speeds of up to at least speeds typical for highway vehicular travel, a coupling assembly for coupling said first and second vehicles to one another while the first vehicle is traveling at any of said highway variable speeds and means carried by the first and second vehicles for permitting freight to be moved between the first and second vehicles when said first and second vehicles are coupled.

24. A transportation system as in claim 23 wherein the first and second vehicles are each buses.

25. A transportation system for use on an expressway comprising separate first and second expressway vehicles adapted for travel on the expressway at variable speeds of up to at least speeds typical for expressway vehicular travel and a coupling assembly for coupling said first and second vehicles to one another while the first vehicle is traveling at any of said expressway speeds.

26. A transportation system as in claim 25 further including means for controlling said coupling assembly remotely.

27. A transportation system as in claim 26 wherein said remote control means includes a laser guidance system.

28. A transportation system as in claim 26 wherein said remote control means includes a video-imaging system.

29. A transportation system as in claim 25 wherein the means includes means for decoupling the first and second vehicles from one another while the first and second vehicles are traveling on the roadway.

30. A transportation system as in claim 25 wherein the first and second vehicles are each buses.

31. A method for coupling first and second expressway vehicles to one another during travel on an expressway by the use of coupling assemblies carried by said first and second vehicles, the method comprising the steps of operating the first vehicle at a substantially constant velocity on the expressway, operating and positioning the second vehicle behind the first vehicle, accelerating the second vehicle until the coupling assemblies contact one another and coupling said first and second vehicles together by securing said assemblies to one another.

32. A method as in claim 31 wherein the coupling step includes the step of orienting the first and second vehicles in a linear configuration with respect to one another.

33. A method as in claim 31 wherein the coupling step includes the step of orienting the first and second vehicles in a parallel configuration with respect to one another.

34. A method as in claim 31 further including the step of controlling the coupling step remotely.

35. A method as in claim 31 further including the step of moving passengers between the first and second vehicles while said vehicles are coupled together.

36. A method as in claim 31 further including the step of moving freight between the first and second vehicles while said vehicles are coupled together.

* * * * *